United States Patent
Hirota et al.

(10) Patent No.: US 6,568,178 B2
(45) Date of Patent: May 27, 2003

(54) DEVICE FOR PURIFYING THE EXHAUST GAS OF AN INTERNAL COMBUSTION ENGINE

(75) Inventors: Shinya Hirota, Susono (JP); Toshiaki Tanaka, Numazu (JP); Koichiro Nakatani, Susono (JP); Kazuhiro Itoh, Mishima (JP); Takamitsu Asanuma, Susono (JP); Koichi Kimura, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/817,187

(22) Filed: Mar. 27, 2001

(65) Prior Publication Data

US 2001/0027647 A1 Oct. 11, 2001

(30) Foreign Application Priority Data

| Mar. 28, 2000 | (JP) | 2000-093017 |
| Mar. 28, 2000 | (JP) | 2000-093024 |
| Apr. 28, 2000 | (JP) | 2000-131653 |

(51) Int. Cl.⁷ .............................................. F01N 3/00
(52) U.S. Cl. .............. 60/297; 60/286; 60/287; 60/296
(58) Field of Search ............... 60/274, 286, 287, 60/296, 297, 311; 55/DIG. 30, 483, 484, 524; 423/213.2, 213.5

(56) References Cited

U.S. PATENT DOCUMENTS

| 2,946,651 A | * | 7/1960 | Houdry ..................... 60/296 |
| 3,796,546 A | * | 3/1974 | Poullot et al. .............. 60/296 |
| 4,515,758 A | * | 5/1985 | Domesle et al. ......... 423/213.2 |

(List continued on next page.)

FOREIGN PATENT DOCUMENTS

| EP | 0 984 142 A1 | 3/2000 |
| JP | 56 148607 | 11/1981 |
| JP | 58-137423 | 8/1983 |
| JP | 59-30507 | 2/1984 |
| JP | 60-135613 | * 7/1985 |
| JP | 60 235620 | 11/1985 |
| JP | 61-28709 | 8/1986 |
| JP | 61-223215 | * 10/1986 |
| JP | 03 271515 | 12/1991 |
| JP | 04031614 A | 3/1992 |
| JP | 5-98932 | 4/1993 |
| JP | 05 179928 | 7/1993 |

(List continued on next page.)

OTHER PUBLICATIONS

A Device For Purifying The Exhaust Gas Of An Internal Combustion Engine; U.S. patent application Nos. 09/979,643, 09/979,262, 09/904,875.

European Search Report, International Search Report.

*Primary Examiner*—Thomas Denion
*Assistant Examiner*—Tu M. Nguyen
(74) *Attorney, Agent, or Firm*—Oliff & Berridge, PLC

(57) ABSTRACT

A device for purifying the exhaust gas of an internal combustion engine is disclosed. The device has a particulate filter arranged in the exhaust system on which the trapped particulates are oxidized, and a reversing mechanism for reversing the exhaust gas upstream side and the exhaust gas downstream side of the particulate filter. The particulate filter has a trapping wall. The trapping wall has a first trapping surface and a second trapping surface. The reversing mechanism reverses the exhaust gas upstream side and the exhaust gas downstream side of the particulate filter so that the first trapping surface and the second trapping surface are used alternately to trap the particulates. The device can improve the amount of particulates that can be oxidized and removed on the particulate filter.

21 Claims, 27 Drawing Sheets

U.S. PATENT DOCUMENTS

| | | | |
|---|---|---|---|
| 4,902,487 A | | 2/1990 | Cooper et al. |
| 4,916,897 A | * | 4/1990 | Hayashi et al. ............... 60/296 |
| 4,929,581 A | * | 5/1990 | Steinwandel et al. .... 423/213.5 |
| 4,934,142 A | * | 6/1990 | Hayashi et al. ............... 60/297 |
| 5,100,632 A | | 3/1992 | Dettling et al. |
| 5,162,287 A | * | 11/1992 | Yoshimoto et al. ....... 423/213.5 |
| 5,221,484 A | * | 6/1993 | Goldsmith et al. ....... 423/213.2 |
| 5,260,035 A | * | 11/1993 | Lachman et al. ....... 55/DIG. 30 |
| 5,768,888 A | * | 6/1998 | Matros et al. ................. 60/296 |
| 5,863,311 A | * | 1/1999 | Nagai et al. ................... 55/524 |
| 5,884,474 A | * | 3/1999 | Topsøe ......................... 60/274 |
| 5,941,066 A | * | 8/1999 | Araki et al. .................. 60/311 |
| 6,167,696 B1 | * | 1/2001 | Maaseidvaag et al. ......... 60/274 |
| 6,314,722 B1 | * | 11/2001 | Matros et al. ................. 60/296 |
| 6,367,246 B1 | * | 4/2002 | Hirota et al. .................. 60/297 |

FOREIGN PATENT DOCUMENTS

| | | |
|---|---|---|
| JP | A 6-159037 | 6/1994 |
| JP | A 6-272541 | 9/1994 |
| JP | 07180536 A | 7/1995 |
| JP | 07 189655 | 7/1995 |
| JP | 7-189656 | 7/1995 |
| JP | B2 7-106290 | 11/1995 |
| JP | 8-338229 | 12/1996 |
| JP | A 9-94434 | 4/1997 |
| JP | 10-220218 | 8/1998 |
| JP | 10-306717 | 11/1998 |
| JP | A 11-300165 | 11/1999 |
| JP | 11-336534 | 12/1999 |
| JP | B2 3012249 | 12/1999 |
| JP | A 2000-18026 | 1/2000 |
| WO | WO 00 42302 A | 7/2000 |

* cited by examiner

Fig. 8
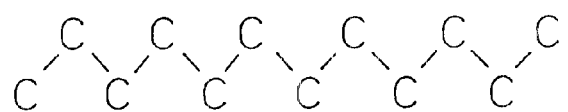
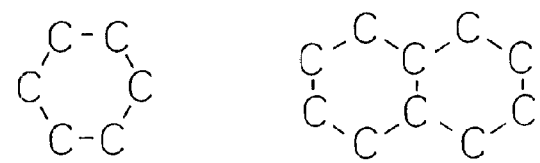
Fig. 9
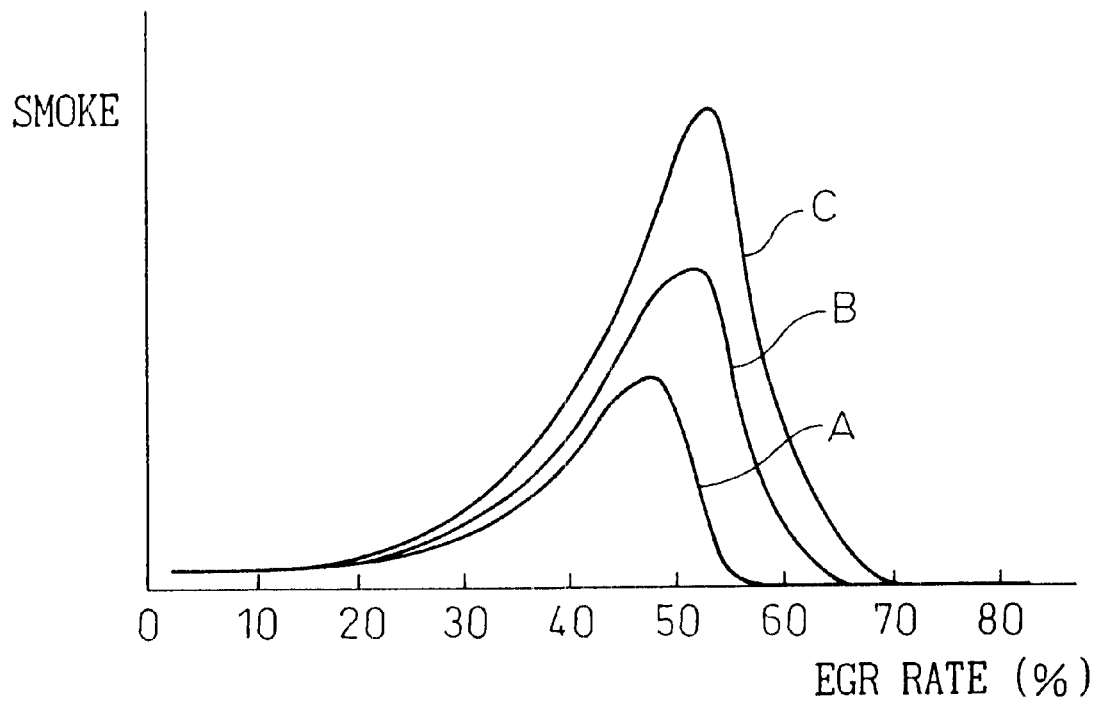

DEVICE FOR PURIFYING THE EXHAUST GAS OF AN INTERNAL COMBUSTION ENGINE

BACKGROUND OF THE INVENTION

1. Field of the Invention

The present invention relates to a device for purifying the exhaust gas of an internal combustion engine.

2. Description of the Related Art

The exhaust gas of an internal combustion engine and, particularly, of a diesel engine, contains particulates comprising carbon as a chief component. Particulates are harmful materials and thus it has been suggested that a particulate filter should be arranged in the exhaust system to trap particulates before they are emitted into the atmosphere. In such a particulate filter, the trapped particulates must be burned and removed to prevent resistance to the exhaust gas from increasing due to the blocked meshes.

In such a regeneration of the particulate filter, if the temperature of the particulates becomes about 600 degrees C., they ignite and burn. However, usually, the temperature of an exhaust gas of a diesel engine is considerably lower than 600 degrees C. and thus heating means is required to heat the particulate filter itself.

Japanese Examined Patent Publication No. 7-106290 discloses that if one of the platinum group metals and one of the oxides of the alkali earth metals are carried on the filter, the particulates on the filter burn and disappear successively at about 400 degrees C. 400 degrees C. is a usual temperature of the exhaust gas of a diesel engine.

However, when the above-mentioned filter is used, the temperature of the exhaust gas is not always about 400 degrees C. Further, a large amount of particulates can be discharged from the engine. Thus, particulates that cannot be burned and removed each time can be deposited on the filter.

In this filter, if a certain amount of particulates is deposited on the filter, the ability to burn and remove particulates drops much so that the filter cannot be regenerated by itself. Thus, if such a filter is merely arranged in the exhaust system, blocking of the filter meshes can occur relative quickly.

SUMMARY OF THE INVENTION

Therefore, an object of the present invention is to provide a device, for purifying the exhaust gas of an internal combustion engine, which can prevent blocking of the particulate filter meshes by the trapped particulates thereon.

According to the present invention, there is provided a first device for purifying the exhaust gas of an internal combustion engine comprising a particulate filter arranged in the exhaust system on which the trapped particulates are oxidized, and reversing means for reversing the exhaust gas upstream side and the exhaust gas downstream side of the particulate filter, wherein the particulate filter has a trapping wall, the trapping wall has a first trapping surface and a second trapping surface, the reversing means reverses the exhaust gas upstream side and the exhaust gas downstream side of the particulate filter so that the first trapping surface and the second trapping surface are used alternately to trap the particulates, and the device further comprises improving means for improving the amount of particulates that can be oxidized and removed on the particulate filter.

According to the present invention, there is provided a second device for purifying the exhaust gas of an internal combustion engine comprising a particulate filter arranged in the exhaust system on which the trapped particulates are oxidized, and reversing means for reversing the exhaust gas upstream side and the exhaust gas downstream side of the particulate filter, wherein the particulate filter has a trapping wall, the trapping wall has a first trapping surface and a second trapping surface, the reversing means reverses the exhaust gas upstream side and the exhaust gas downstream side of the particulate filter so that the first trapping surface and the second trapping surface are used alternately to trap the particulates, and the both end portions of the particulate filter have an oxidization ability higher than that of the central portion of said particulate filter.

According to the present invention, there is provided a third device for purifying the exhaust gas of an internal combustion engine comprising a particulate filter arranged in the exhaust system on which the trapped particulates are oxidized, and reversing means for reversing the exhaust gas upstream side and the exhaust gas downstream side of the particulate filter, wherein the particulate filter carries an active-oxygen releasing agent, active-oxygen released from the active-oxygen releasing agent oxidizes the trapped particulates, the active-oxygen releasing agent holds $NO_x$ to combine the $NO_x$ with oxygen when excessive oxygen is present in the surroundings and releases to decompose the combined $NO_x$ and oxygen into $NO_x$ and active-oxygen when the oxygen concentration in the surroundings drops, the particulate filter has a trapping wall, the trapping wall has a first trapping surface and a second trapping surface, the reversing means reverses the exhaust gas upstream side and the exhaust gas downstream side of the particulate filter so that the first trapping surface and the second trapping surface are used alternately to trap the particulates, and the device further comprises improving means for improving the amount of particulates that can be oxidized and removed of the particulate filter by making the oxygen concentration in the surroundings drop to release $NO_x$ from the active-oxygen releasing agent.

The present invention will be more fully understood from the description of preferred embodiments of the invention set forth below, together with the accompanying drawings.

BRIEF DESCRIPTION OF THE DRAWINGS

In the drawings:

FIG. 6 is a view showing the amounts of produced smoke, $NO_x$, and the like;

FIG. 8 is a view showing the fuel molecules;

FIG. 9 is a view showing the relationship between the amount of produced $NO_x$ and the EGR rate;

FIG. 13 is a view showing the opening degree of the throttle valve and the like;

DESCRIPTION OF THE PREFERRED EMBODIMENT

Figure 1:
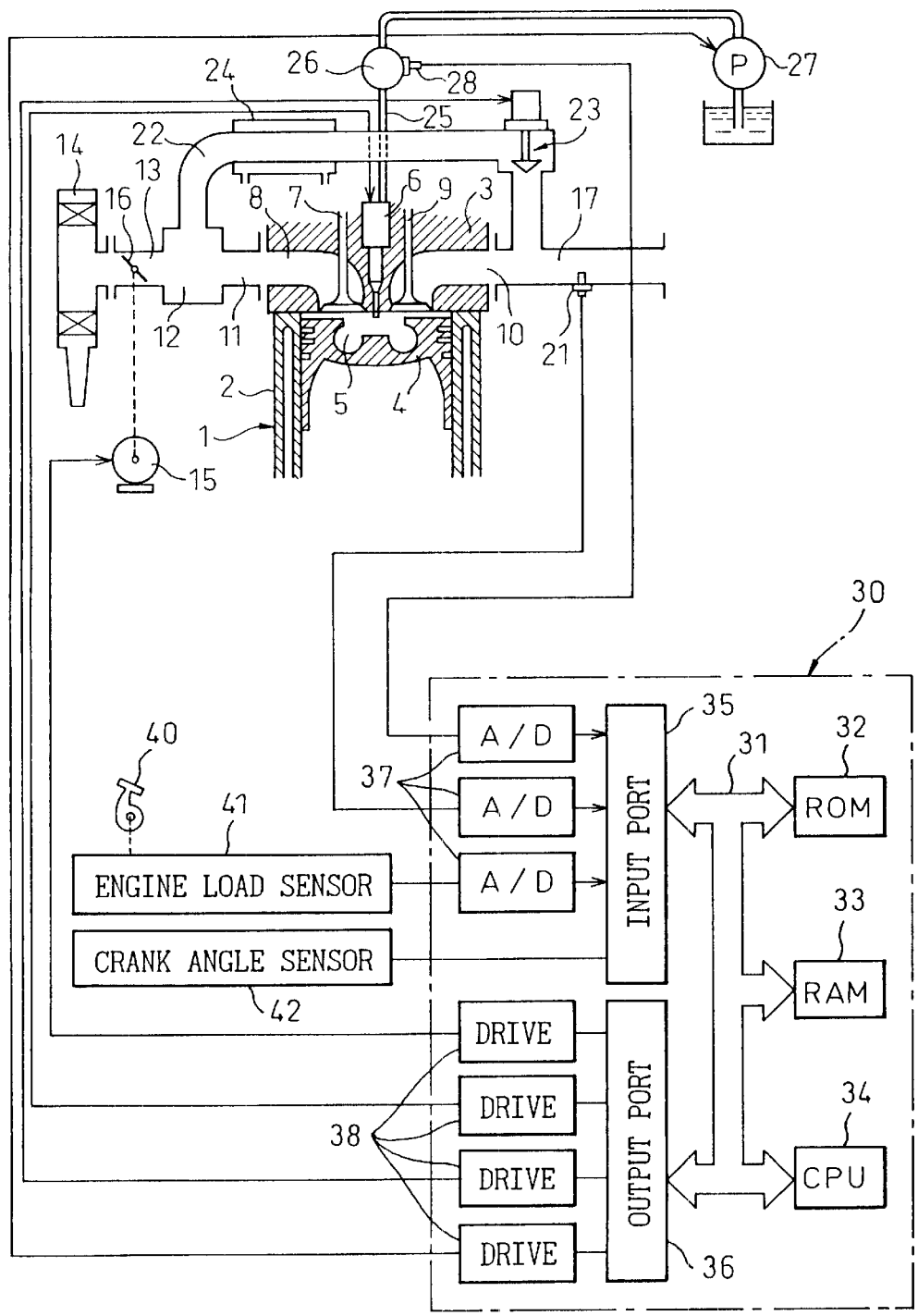
FIG. 1 is a schematic vertical sectional view of a four-stroke diesel engine with a device for purifying the exhaust gas according to the present invention.
Figure 2:
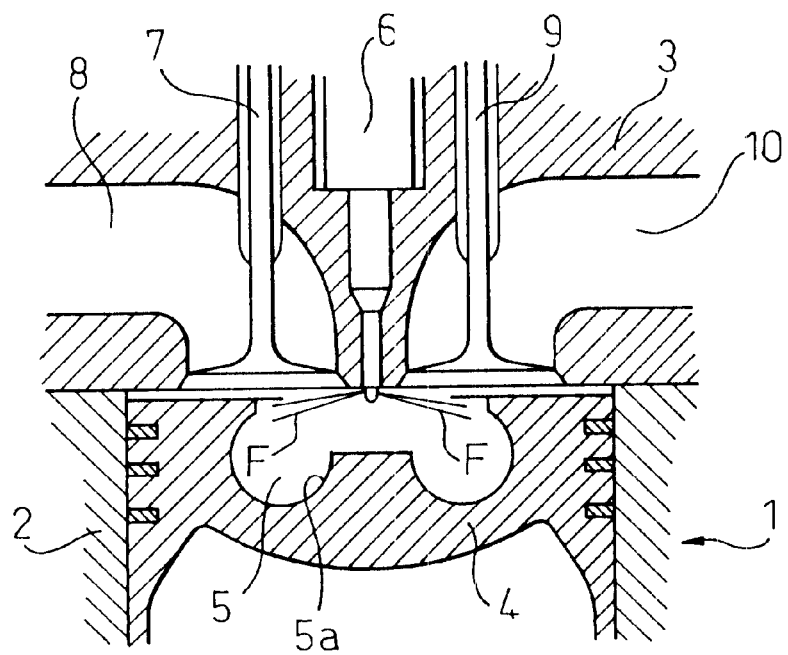
FIG. 2 is an enlarged vertical sectional view of the combustion chamber of FIG. 1.
Figure 3:
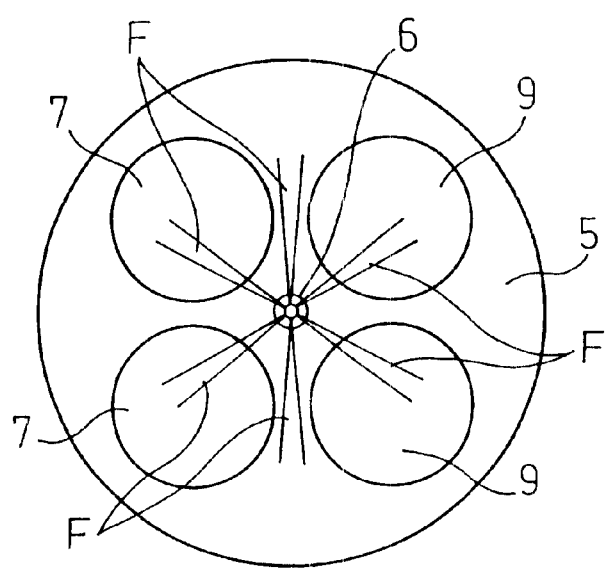
FIG. 3 is a bottom view of the cylinder-head of FIG. 1.

FIG. 1 is a schematic vertical sectional view of a four-stroke diesel engine with a device for purifying the exhaust gas according to the present invention. FIG. 2 is an enlarged vertical sectional view of a combustion chamber of diesel engine of FIG. 1. FIG. 3 is a bottom view of a cylinder-head of diesel engine of FIG. 1. Referring FIGS. 1–3, reference numeral 1 designates an engine body, reference numeral 2 designates a cylinder-block, reference numeral 3 designates a cylinder-head, reference numeral 4 designates a piston, reference numeral 5a designates a cavity formed on the top surface of piston 4, reference numeral 5 designates a combustion chamber formed in the cavity 5a, reference numeral 6 designates an electrically controlled fuel injector, reference numeral 7 designates a pair of intake valves, reference numeral 8 designates an intake port, reference numeral 9 designates a pair of exhaust valves, and reference numeral 10 designates an exhaust port. The intake port 8 is connected to a surge tank 12 via a corresponding intake tube 11. The surge tank 12 is connected to an air-cleaner 14 via an intake duct 13. A throttle valve 16 driven by an electric motor 15 is arranged in the intake duct 13. On the other hand, the exhaust port 10 is connected to an exhaust manifold 17.

As shown in FIG. 1, an air-fuel ratio sensor 21 is arranged in the exhaust manifold 17. The exhaust manifold 17 and the surge tank 12 are connected with each other via an EGR passage 22. An electrically controlled EGR control valve 23 is arranged in the EGR passage 22. An EGR cooler 24 is arranged around the EGR passage 22 to cool the EGR gas flowing in the EGR passage 22. In the embodiment of FIG. 1, the engine cooling water is led into the EGR cooler 24 and thus the EGR gas is cooled by the engine cooling water.

On the other hand, each fuel injector 6 is connected to the fuel reservoir, that is, a common rail 26 via a fuel supply tube 25. Fuel is supplied to the common rail 26 from an electrically controlled variable discharge fuel pump 27. Fuel supplied in the common rail 26 is supplied to the fuel injector 6 via each fuel supply tube 25. A fuel pressure sensor 28 for detecting a fuel pressure in the common rail 26 is attached to the common rail 26. The discharge amount of the fuel pump is controlled on the basis of an output signal of the fuel pressure sensor 28 such that the fuel pressure in the common rail 26 becomes the target fuel pressure.

Reference numeral 30 designates an electronic control unit. It is comprised of a digital computer and is provided with a ROM (read only memory) 32, a RAM (random access memory) 33, a CPU (microprocessor) 34, an input port 35, and an output port 36 connected with each other by a bi-directional bus 31. The output signals of the air-fuel sensor 21 and the fuel pressure sensor 28 are input to the input port 35 via each A/D converter 37. An engine load sensor 41 is connected to the accelerator pedal 40, which generates an output voltage proportional to the amount of depression (L) of the accelerator pedal 40. The output signal of the engine load sensor 41 is also input to the input port 35 via a A/D converter 37. Further, the output signal of a crank angle sensor 42 for generating an output pulse each time the crankshaft rotates by, for example, 30 degrees is also input to the input port 35. The fuel injector 6, the electronic motor 15, the EGR control valve 23, and the fuel pump 27 are connected to the output port 36 via each drive circuit 38 to be actuated on the basis of the input signals.

As shown in FIGS. 2 and 3, in the embodiment of the present invention, the fuel injector 6 comprises of a nozzle having six nozzle holes. Fuel sprays (F) are injected from the nozzle holes in slightly downward direction against a horizontal plane with equal angular intervals. As shown in FIG. 3, two fuel sprays (F) of the six fuel sprays (F) are scattered along the lower surface of each exhaust valve 9. FIGS. 2 and 3 show the case where fuel is injected at the end of the compression stroke. In this case, the fuel sprays (F) progress toward the inside periphery surface of the cavity 5 and thereafter are ignited and burned.

Figure 4:
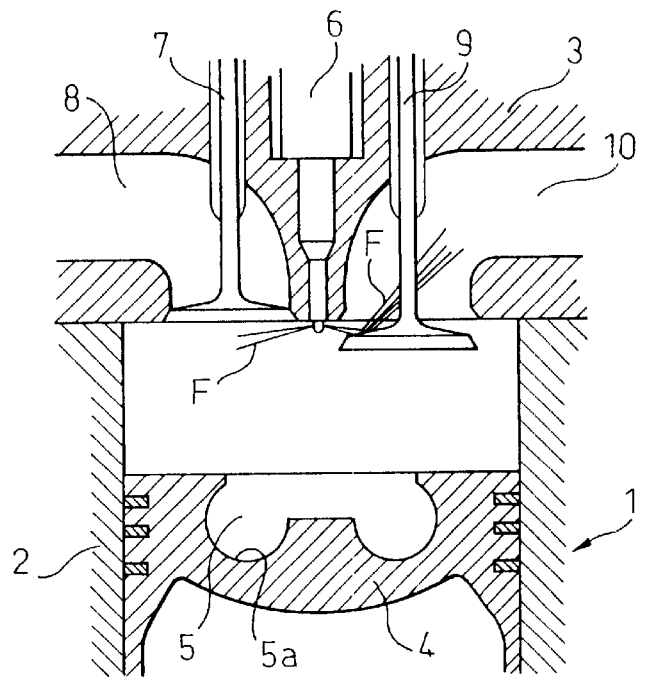
FIG. 4 is an enlarged vertical sectional view of the combustion chamber of FIG. 1.
Figure 5:
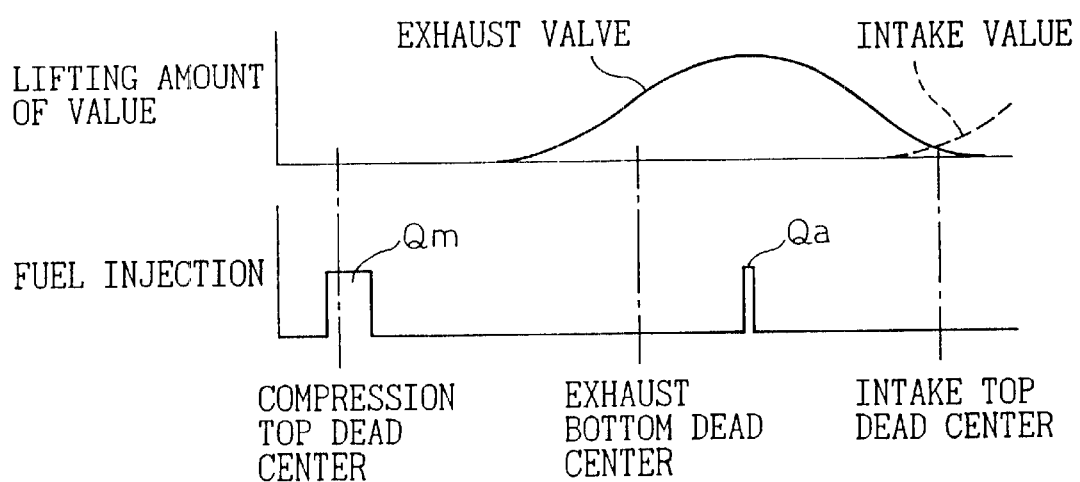
FIG. 5 is a view showing the relationship between the lifting amounts of the intake valve and the exhaust valve and the fuel injection.

FIG. 4 shows the case in that additional fuel is injected from the fuel injector 6 when the lifting amount of the exhaust valves is the maximum in the exhaust stroke. That is, FIG. 5 shows the case that the main fuel injection (Qm) is carried out close to the compression top dead center and thereafter the additional fuel injection (Qa) is carried out in the middle stage of the exhaust stroke. In this case, the fuel sprays (F) that progress toward the exhaust valves 9 are directed between the umbrella-like back surface of the exhaust valve 9 and the exhaust port 10. In other words, two nozzle holes, of the six nozzle holes of the fuel injector 6, are formed such that when the exhaust valves 9 are opened and the additional fuel injection (Qa) is carried out, the fuel sprays (F) are directed between the back surface of the exhaust valve 9 and the exhaust port 10. In the embodiment of FIG. 4, these fuel sprays (F) impinge the back surface of the exhaust valve 9 and reflect from the back surface of the exhaust valves 9, and thus are directed into the exhaust port 10.

Figure 6:
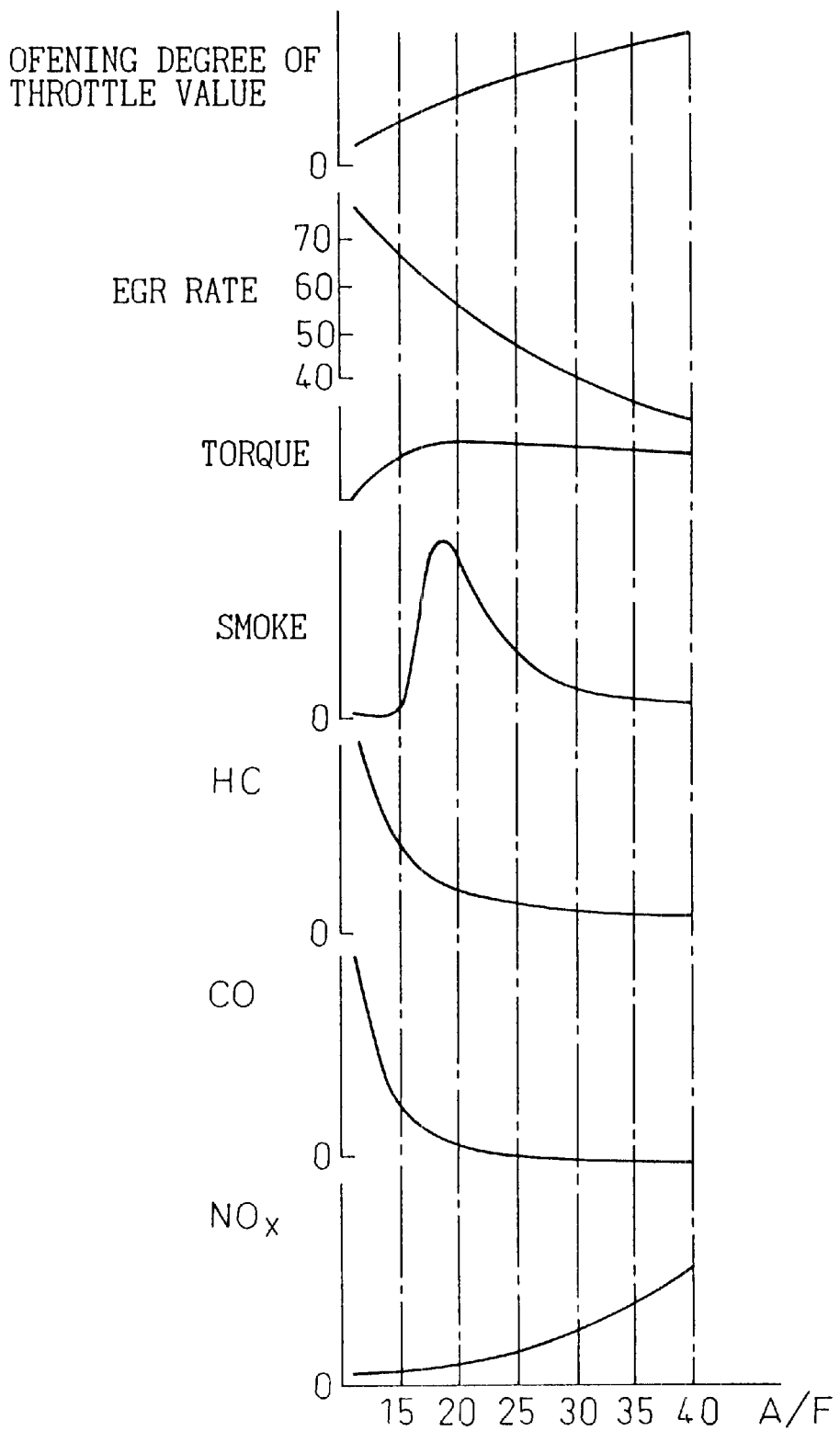

Usually, the additional fuel injection (Qa) is not carried out, and the main fuel injection (Qm) only is carried out. FIG. 6 indicates an example of an experiment showing the changing in the output torque and the amount of smoke, HC, CO, and $NO_X$ exhausted at that time when changing the air-fuel ratio A/F (abscissa in FIG. 6) by changing the opening degree of the throttle valve 16 and the EGR rate at the time of low engine load operation. As will be understood from FIG. 6, in this experiment, the smaller the air-fuel ratio A/F becomes, the larger the EGR rate becomes. When the air-fuel ratio is below the stoichiometric air-fuel ratio (nearly equal 14.6), the EGR rate becomes over 65 percent.

As shown in FIG. 6, if the EGR rate is increased to reduce the air-fuel ratio A/F, when the EGR rate becomes close to 40 percent and the air-fuel ratio A/F becomes about 30, the amount of produced smoke starts to increase. Next, when the EGR rate is further increased and the air-fuel ratio A/F is made smaller, the amount of produced smoke sharply increases and peaks. Next, when the EGR rate is further increased and the air-fuel ratio A/F is made smaller, the amount of produced smoke sharply decreases. When the EGR rate is made over 65 percent and the air-fuel ratio A/F becomes close to 15.0, the amount of produced smoke is substantially zero. That is, almost no soot is produced. At this time, the output torque of the engine falls somewhat and the amount of produced $NO_X$ becomes considerably lower. On the other hand, at this time, the amounts of produced HC and CO start to increase.

Figure 7A:
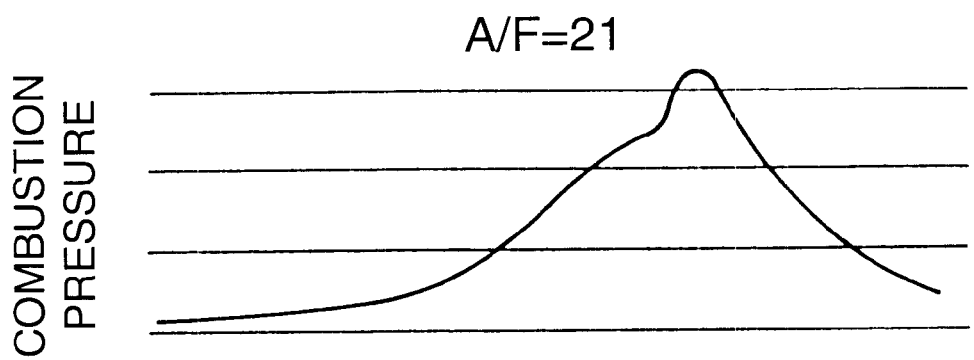
FIGS. 7(A) and 7(B) are views showing the combustion pressure.
Figure 7B:
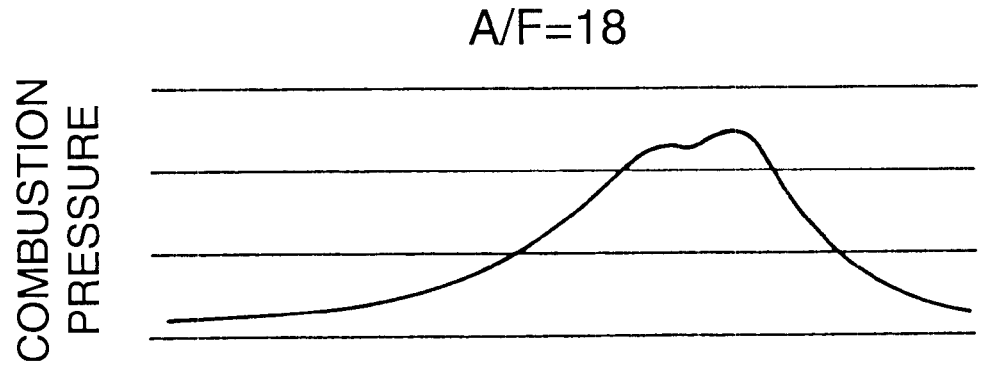

FIG. 7(A) shows the changes in combustion pressure in the combustion chamber 5 when the amount of produced smoke is the greatest near an air-fuel ratio A/F of 21. FIG. 7(B) shows the changes in combustion pressure in the combustion chamber 5 when the amount of produced smoke is substantially zero near an air-fuel ratio A/F of 18. As will be understood from a comparison of FIG. 7(A) and FIG. 7(B), the combustion pressure is lower in the case shown in FIG. 7(B) where the amount of produced smoke is substantially zero than the case shown in FIG. 7(A) where the amount of produced smoke is large.

The following may be said from the results of the experiment shown in FIGS. 6 and 7. That is, first, when the air-fuel ratio A/F is less than 15.0 and the amount of produced smoke is substantially zero, the amount of produced $NO_X$ decreases considerably as shown in FIG. 6. The fact that the amount of produced $NO_X$ decreases means that the combustion temperature in the combustion chamber 5 falls. Therefore, it can be said that when almost no soot is produced, the combustion temperature in the combustion chamber 5 becomes lower. The same fact can be said from FIG. 7. That is, in the state shown in FIG. 7(B) where almost no soot is produced, the combustion pressure becomes lower, therefore the combustion temperature in the combustion chamber 5 becomes lower at this time.

Second, when the amount of produced smoke, that is, the amount of produced soot, becomes substantially zero, as shown in FIG. 6, the amounts of exhausted HC and CO increase. This means that the hydrocarbons are exhausted without changing into soot. That is, the straight chain hydrocarbons and aromatic hydrocarbons contained in the fuel and shown in FIG. 8 decompose when raised in temperature in an oxygen insufficient state resulting in the formation of a precursor of soot. Next, soot mainly composed of solid masses of carbon atoms is produced. In this case, the actual process of production of soot is complicated. How the precursor of soot is formed is not clear, but whatever the case, the hydrocarbons shown in FIG. 8 change to soot through the soot precursor. Therefore, as explained above, when the amount of production of soot becomes substantially zero, the amount of exhaust of HC and CO increases as shown in FIG. 6, but the HC at this time is a soot precursor or in a state of hydrocarbon before that.

Summarizing these considerations based on the results of the experiments shown in FIGS. 6 and 7, when the combustion temperature in the combustion chamber 5 is low, the amount of produced soot becomes substantially zero. At this time, a soot precursor or a state of hydrocarbons before that is exhausted from the combustion chamber 5. More detailed experiments and studies were conducted. As a result, it was learned that when the temperature of the fuel and the gas around the fuel in the combustion chamber 5 is below a certain temperature, the process of growth of soot stops midway, that is, no soot at all is produced and that when the temperature of the fuel and the gas around the fuel in the combustion chamber 5 becomes higher than the certain temperature, soot is produced.

The temperature of the fuel and the gas around the fuel when the process of growth of hydrocarbons stops in the state of the soot precursor, that is, the above certain temperature, changes depending on various factors such as the type of the fuel, the air-fuel ratio, and the compression ratio, so it cannot be said exactly what it is, but this certain temperature is deeply related to the amount of production of $NO_X$. Therefore, this certain temperature can be defined to a certain degree from the amount of production of $NO_X$. That is, the greater the EGR rate is, the lower the temperature of the fuel and the gas around it at the time of combustion, becomes and the lower the amount of produced $NO_X$ becomes. At this time, when the amount of produced $NO_X$ becomes around 10 ppm or less, almost no soot is produced any more. Therefore, the above certain temperature substantially corresponds to the temperature when the amount of produced $NO_X$ becomes around 10 ppm or less.

Once soot is produced, it is impossible to purify it by after-treatment using a catalyst having an oxidation function. As opposed to this, a soot precursor or a state of hydrocarbons before that can be easily purified by after-treatment using a catalyst having an oxidation function. Thus, it is extremely effective for the purifying of the exhaust gas that the hydrocarbons are exhausted from the combustion chamber 5 in the form of a soot precursor or a state before that with the reduction of the amount of produced $NO_X$.

Now, to stop the growth of hydrocarbons in the state before the production of soot, it is necessary to suppress the temperature of the fuel and the gas around it at the time of combustion in the combustion chamber 5 to a temperature lower than the temperature where soot is produced. In this case, it was learned that the heat absorbing action of the gas around the fuel at the time of combustion of the fuel has an extremely great effect in suppression the temperatures of the fuel and the gas around it.

That is, if only air exists around the fuel, the vaporized fuel will immediately react with the oxygen in the air and burn. In this case, the temperature of the air away from the fuel does not rise so much. Only the temperature around the fuel becomes locally extremely high. That is, at this time, the air away from the fuel does not absorb the heat of combustion of the fuel much at all. In this case, since the combustion temperature becomes extremely high locally, the unburned hydrocarbons receiving the heat of combustion produce soot.

On the other hand, when fuel exists in a mixed gas of a large amount of inert gas and a small amount of air, the situation is somewhat different. In this case, the evaporated fuel disperses in the surroundings and reacts with the oxygen mixed in the inert gas to burn. In this case, the heat of combustion is absorbed by the surrounding inert gas, so the combustion temperature no longer rises so much. That is, the combustion temperature can be kept low. That is, the presence of inert gas plays an important role in the suppression of the combustion temperature. It is possible to keep the combustion temperature low by the heat absorbing action of the inert gas.

In this case, to suppress the temperature of the fuel and the gas around it to a temperature lower than the temperature at which soot is produced, an amount of inert gas enough to absorb an amount of heat sufficient for lowering the temperatures is required. Therefore, if the amount of fuel increases, the amount of required inert gas increases with this. Note that, in this case, the larger the specific heat of the inert gas is, the stronger the heat absorbing action becomes. Therefore, a gas with a large specific heat is preferable as the inert gas. In this regard, since $CO_2$ and EGR gas have relatively large specific heats, it may be said to be preferable to use EGR gas as the inert gas.

FIG. 9 shows the relationship between the EGR rate and smoke when using EGR gas as the inert gas and changing the degree of cooling of the EGR gas. That is, the curve (A) in FIG. 9 shows the case of strongly cooling the EGR gas and maintaining the temperature of the EGR gas at about 90 degrees C., the curve (B) shows the case of cooling the EGR gas by a compact cooling apparatus, and the curve (C) shows the case of not compulsorily cooling the EGR gas.

When strongly cooling the EGR gas, as shown by the curve (A) in FIG. 9, the amount of produced soot peaks when the EGR rate is a slightly below 50 percent. In this case, if the EGR rate is made about 55 percent or higher, almost no soot is produced any longer.

On the other hand, when the EGR gas is slightly cooled as shown by the curve (B) in FIG. 9, the amount of produced soot peaks when the EGR rate is slightly higher than 50 percent. In this case, if the EGR rate is made above about 65 percent, almost no soot is produced.

Further, when the EGR gas is not forcibly cooled as shown by the curve (C) in FIG. 9, the amount of produced soot peaks near an EGR rate of 55 percent. In this case, if the EGR rate is made over about 70 percent, almost no soot is produced.

Note that FIG. 9 shows the amount of produced smoke when the engine load is relatively high. When the engine load becomes smaller, the EGR rate at which the amount of produced soot peaks falls somewhat, and the lower limit of the EGR rate at which almost no soot is produced, also fall somewhat. In this way, the lower limit of the EGR rate at which almost no soot is produced changes in accordance with the degree of cooling of the EGR gas or the engine load.

Figure 10:
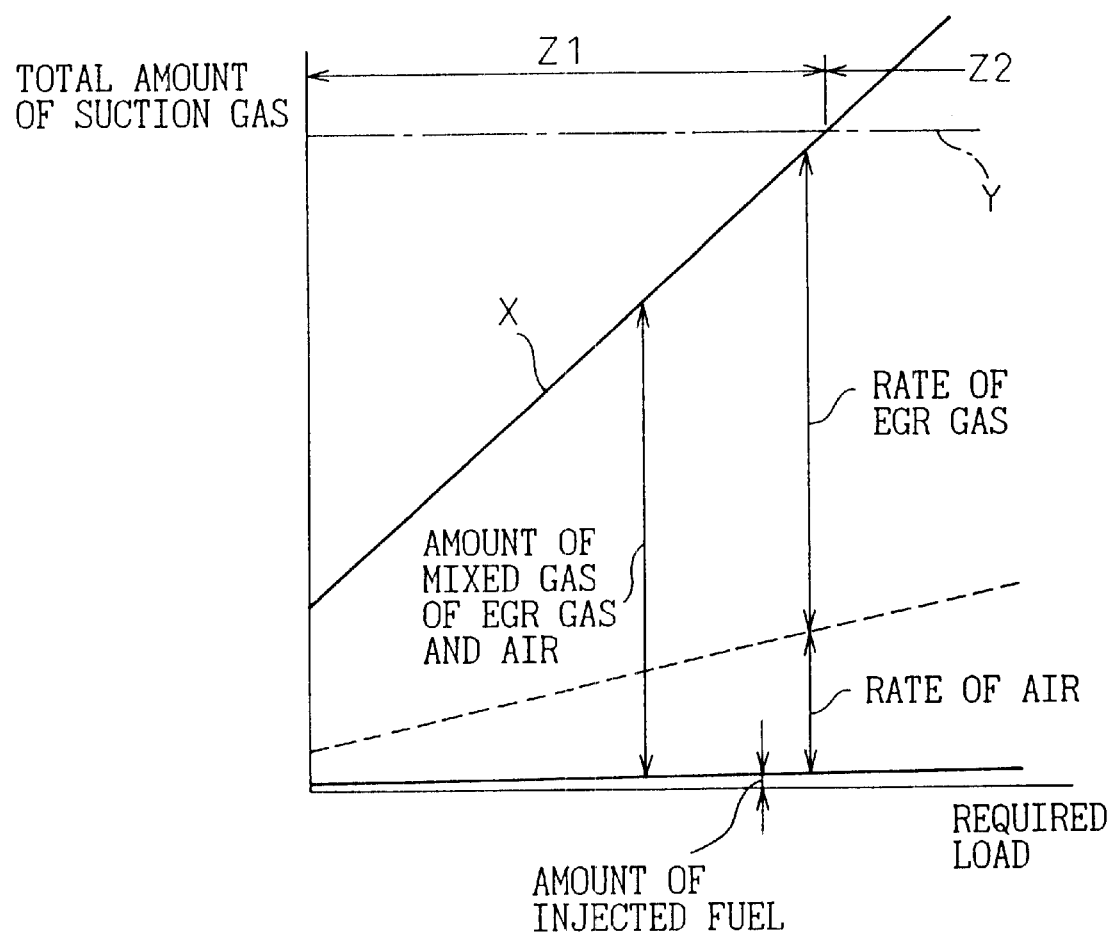
FIG. 10 is a view showing the relationship between the amount of injected fuel and the amount of mixed gas.

FIG. 10 shows the amount of mixed gas of EGR gas and air, the ratio of air in the mixed gas, and the ratio of EGR gas in the mixed gas, required to make the temperature of the fuel and the gas around it, at the time of combustion, a temperature lower than the temperature at which soot is produced in the case of the use of EGR gas as an inert gas. Note that, in FIG. 10, the ordinate shows the total amount of suction gas taken into the combustion chamber 5. The broken line (Y) shows the total amount of suction gas able to be taken into the combustion chamber 5 when supercharging is not being performed. Further, the abscissa shows the required load. (Z1) shows the low engine load operation region.

Referring to FIG. 10, the ratio of air, that is, the amount of air in the mixed gas shows the amount of air necessary for causing the injected fuel to completely burn. That is, in the case shown in FIG. 10, the ratio of the amount of air and the amount of injected fuel becomes the stoichiometric air-fuel ratio. On the other hand, in FIG. 10, the ratio of EGR gas, that is, the amount of EGR gas in the mixed gas, shows the minimum amount of EGR gas required for making the temperature of the fuel, and the gas around it, a temperature lower than the temperature at which soot is produced when the injected fuel has burned completely. This amount of EGR gas is, expressed in term of the EGR rate, equal to or larger than 55 percent, in the embodiment shown in FIG. 10, it is equal to or larger than 70 percent. That is, if the total amount of suction gas taken into the combustion chamber 5 is made the solid line (X) in FIG. 10 and the ratio between the amount of air and the amount of EGR gas in the total amount of suction gas (X) is made the ratio shown in FIG. 10, the temperature of the fuel and the gas around it becomes a temperature lower than the temperature at which soot is produced and therefore no soot at all is produced. Further, the amount of produced $NO_X$ at this time is about 10 ppm or less and therefore the amount of produced $NO_X$ becomes extremely small.

If the amount of injected fuel increases, the amount of generated heat at the time of combustion increases so, to maintain the temperature of the fuel and the gas around it at a temperature lower than the temperature at which soot is produced, the amount of heat absorbed by the EGR gas must be increased. Therefore, as shown in FIG. 10, the amount of EGR gas has to be increased with an increase in the amount of injected fuel. That is, the amount of EGR gas has to be increased as the required engine load becomes higher.

On the other hand, in the engine load region (Z2) of FIG. 10, the total amount of suction gas (X) required for inhibiting the production of soot exceeds the total amount of suction gas (Y) that can be taken in. Therefore, in this case, to supply the total amount of suction gas (X), required for inhibiting the production of soot, into the combustion chamber 5, it is necessary to supercharge or pressurize both the EGR gas and the intake air or just the EGR gas. When not supercharging or pressurizing the EGR gas etc., in the engine load region (Z2), the total amount of suction gas (X) corresponds to the total amount of suction gas (Y) that can be taken in. Therefore, in this case, to inhibit the production of soot, the amount of air is reduced somewhat to increase the amount of EGR gas and the fuel is made to burn in a state where the air-fuel ratio is rich.

As explained above, FIG. 10 shows the case of combustion of fuel at the stoichiometric air-fuel ratio. In the low engine load operating region (Z1) shown in FIG. 10, even if the amount of air is made smaller than the amount of air shown in FIG. 10, that is, even if the air-fuel ratio is made rich, it is possible to inhibit the production of soot and make the amount of produced $NO_X$ around 10 ppm or less. Further, in the low engine load operating region (Z1) shown in FIG. 10, even of the amount of air is made greater than the amount of air shown in FIG. 10, that is, the average of air-fuel ratio is made lean of 17 to 18, it is possible to inhibit the production of soot and make the amount of produced $NO_X$ around 10 ppm or less.

That is, when the air-fuel ratio is made rich, the fuel is in excess, but since the combustion temperature is suppressed to a low temperature, the excess fuel does not change into soot and therefore soot is not produced. Further, at this time, only an extremely small amount of $NO_X$ is produced. On the other hand, when the average of air-fuel ratio is lean or when the air-fuel ratio is the stoichiometric air-fuel ratio, a small amount of soot is produced if the combustion temperature becomes higher, but the combustion temperature is suppressed to a low temperature, and thus no soot at all is produced. Further, only an extremely small amount of $NO_X$ is produced.

In this way, in the low engine load operating region (Z1), despite the air-fuel ratio, that is, whether the air-fuel ratio is rich or the stoichiometric air-fuel ratio, or the average of air-fuel ratio is lean, no soot is produced and the amount of produced $NO_X$ becomes extremely small. Therefore, considering the improvement of the fuel consumption rate, it may be said to be preferable to make the average of air-fuel ratio lean.

By the way, only when the engine load is relative low and the amount of generated heat is a small, can the temperature of the fuel and the gas around the fuel in the combustion be suppressed to below a temperature at which the process of growth of soot stops midway. Therefore, in the embodiment of the present invention, when the engine load is relative low, the temperature of the fuel and the gas around the fuel in the combustion is suppressed below a temperature at which the process of growth of soot stops midway and thus a first combustion, i.e., a low temperature combustion is carried out. When the engine load is relative high, a second combustion, i.e., normal combustion as usual is carried out. Here, as can be understood from the above explanation, the first combustion, i.e., the low temperature combustion is a combustion in which the amount of inert gas in the combustion chamber is larger than the worst amount of inert gas causing the maximum amount of produced soot and thus no soot at all is produced. The second combustion, i.e., the normal combustion is a combustion in which the amount of inert gas in the combustion chamber is smaller than the worst amount of inert gas.

Figure 11:
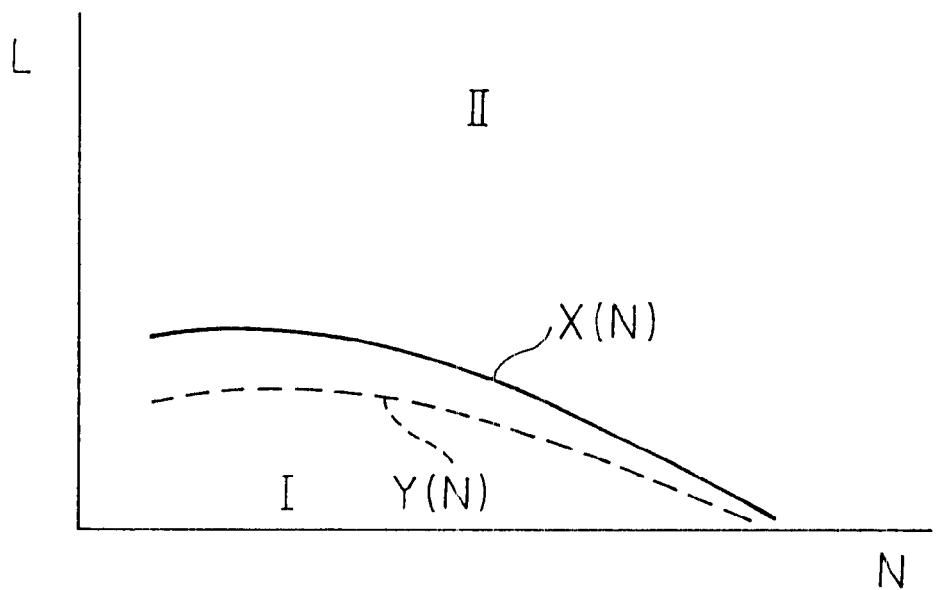
FIG. 11 is a view showing the first operating region (I) and the second operating region (II)

FIG. 11 shows a first operating region (I) in which the first combustion, i.e., the low temperature combustion is carried out and a second operating region (II) in which the second combustion, i.e., the normal combustion is carried out. In FIG. 11, the ordinate (L) shows the amount of depression of the accelerator pedal 40, i.e., the required engine load. The abscissa (N) shows the engine speed. Further, in FIG. 11, X(N) shows a first boundary between the first operating region (I) and the second operating region (II). Y(N) shows a second boundary between the first operating region (I) and the second operating region (II). The decision of changing from the first operating region (I) to the second operating region (II) is carried out on the basis of the first boundary X(N). The decision of changing from the second operating region (II) to the first operating region (I) is carried out on the basis of the second boundary Y(N).

That is, when the engine operating condition is in the first operating region (I) and the low temperature combustion is carried out, if the required engine load (L) increases beyond the first boundary X(N) that is a function of the engine speed (N), it is determined that the engine operating region shifts in the second operating region (II) and thus the normal combustion is carried out. Thereafter, if the required engine load (L) decreases below the second boundary Y(N) that is a function of the engine speed (N), it is determined that the engine operating region shifts in the first operating region (I) and thus the low temperature combustion is carried out again.

Figure 12:
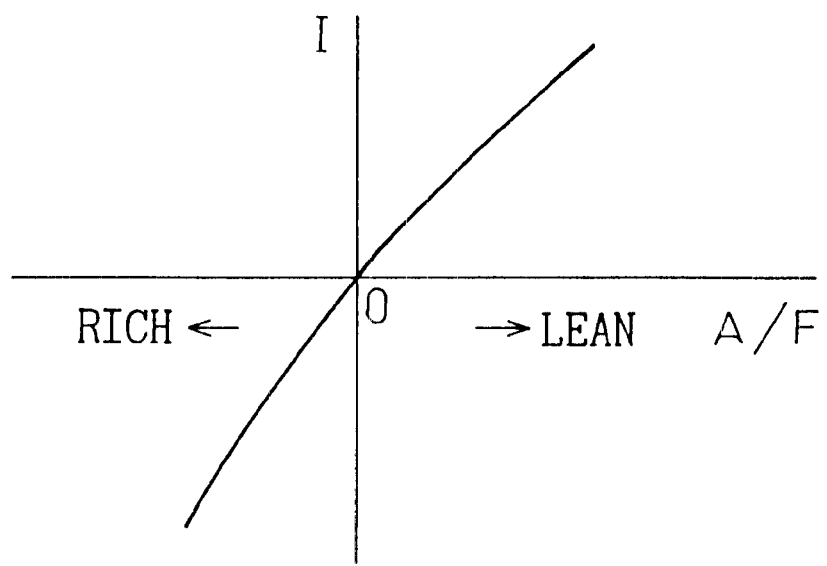
FIG. 12 is a view showing the output of the air-fuel ratio sensor.

FIG. 12 shows the output of the air-fuel ratio sensor 21. As shown in FIG. 12, the output current (I) of the air-fuel ratio sensor 21 changes in accordance with the air-fuel ratio A/F. Accordingly, the air-fuel ratio can be known from the output current (I) of the air-fuel ration sensor 21. Next, referring FIG. 13, the engine operating control in the first operating region (I) and the second operating region (II) will be explained schematically.

Figure 13:
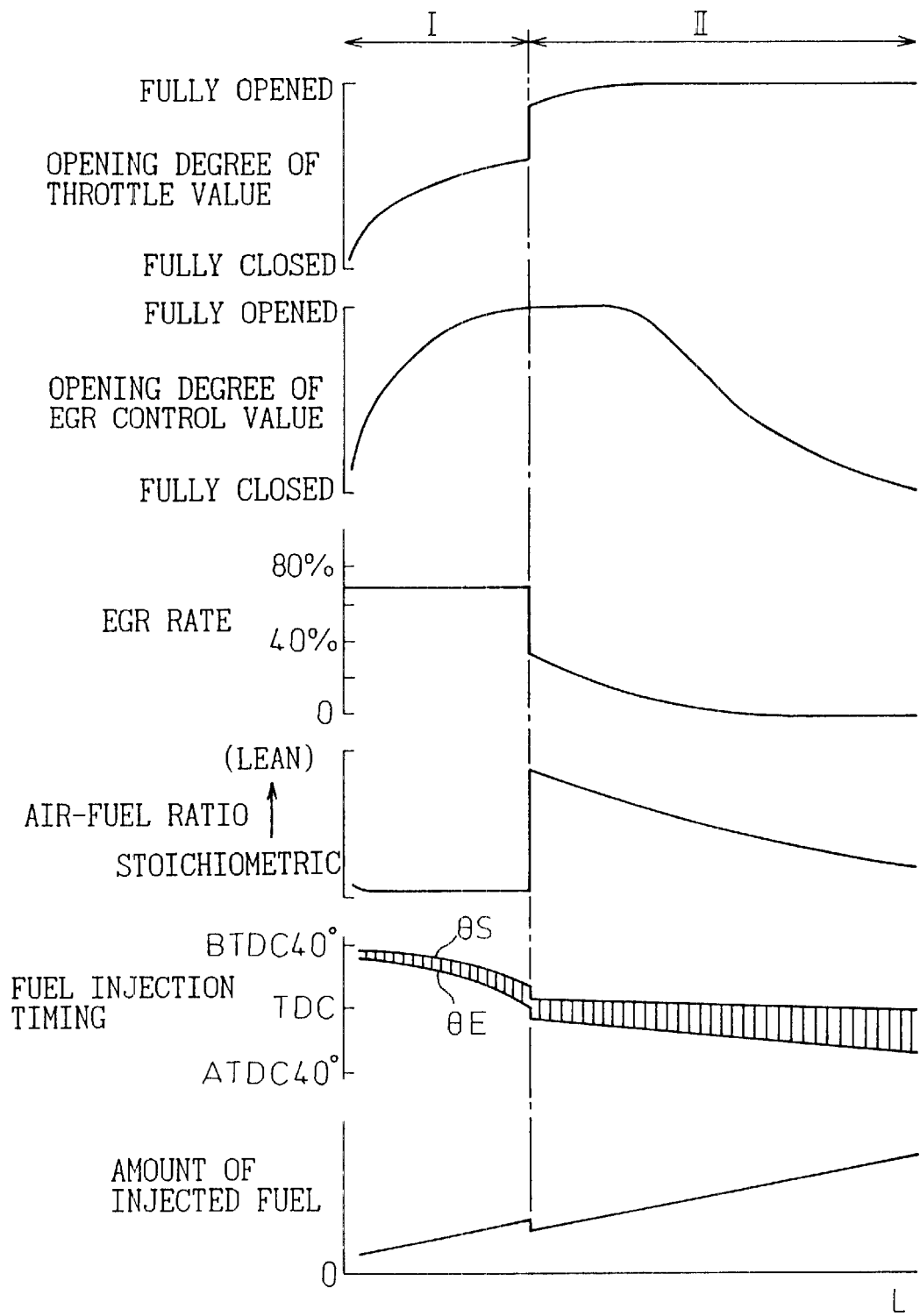

FIG. 13 shows the opening degree of the throttle valve 16, the opening degree of the EGR control valve 23, the EGR rate, the air-fuel ratio, the fuel injection timing, and the amount of injected fuel with respect to the required engine load (L). As shown in FIG. 13, in the first operating region (I) when the required engine load (L) is low, the throttle valve 16 is gradually opened from near the fully closed state to near the half opened state along with the increase of the required engine load (L), and the EGR control valve 23 is gradually opened from near the fully closed state to the fully opened state along with the increase in the required engine load (L). In the embodiment shown in FIG. 13, the EGR rate in the first operating region (I) is made about 70 percent and the air-fuel ratio therein is made slightly lean.

In the other words, in the first operating region (I), the opening degrees of the throttle valve 16 and the EGR control valve 23 are controlled such that the EGR rate becomes about 70 percent and the air-fuel ratio becomes a slightly lean air-fuel ratio. The air-fuel ratio at this time is controlled to the target air-fuel ratio to correct the opening degree of the EGR control valve 23 on the basis of the output signal of the air-fuel ratio sensor 21. In the first operating region (I), the fuel is injected before the compression top dead center TDC. In this case, the starting time (θS) of fuel injection is delayed along with the increase of the required engine load (L) and the ending time (θE) of fuel injection is delayed along with the delay of the starting time (θS) of fuel injection.

When in the idle operating mode, the throttle valve 16 is closed to near the fully closed state. In this time, the EGR control valve 23 is also closed near the fully closed state. When the throttle valve 16 is closed to near the fully closed state, the pressure in the combustion chamber 5 in the initial stage of the compression stroke is made low and thus the compression pressure becomes low. When the compression pressure becomes low, the compression work of the piston 4 becomes small and thus the vibration of the engine body 1 becomes small. That is, when in the idle operating mode, the throttle valve 16 is closed near the fully closed state to restrain the vibration of the engine body 1.

On the other hand, when the engine operating region changes from the first operating region (I) to the second operating region (II), the opening degree of the throttle valve 16 increases by a step from the half opened state toward the fully opened state. In this time, in the embodiment shown in FIG. 13, the EGR rate decreases by a step from about 70 percent to below 40 percent and the air-fuel ratio increases by a step. That is, the EGR rate jumps beyond the EGR rate extent (FIG. 9) in which the large amount of smoke is produced and thus the large amount of smoke is not produced when the engine operating region changes from the first operating region (I) to the second operating region (II).

In the second operating region (II), the normal combustion as usual is carried out. This combustion causes some production of soot and $NO_X$. However, the thermal efficiency thereof is higher than that of the low temperature combustion. Thus, when the engine operating region changes from the first operating region (I) to the second operating region (II), the amount of injected fuel decreases by a step as shown in FIG. 13.

In the second operating region (II), the throttle valve 16 is held in the fully opened state except in a part thereof. The opening degree of the EGR control valve 23 decreases gradually along with the increase of the required engine load (L). In this operating region (II), the EGR rate decreases along with the increase of the required engine load (L) and the air-fuel ratio decreases along with the increase of the required engine load (L). However, the air-fuel ratio is made a lean air-fuel ratio even if the required engine load (L) becomes high. Further, in the second operating region (II), the starting time (θS) of fuel injection is made near the compression top dead center TDC.

Figure 14:
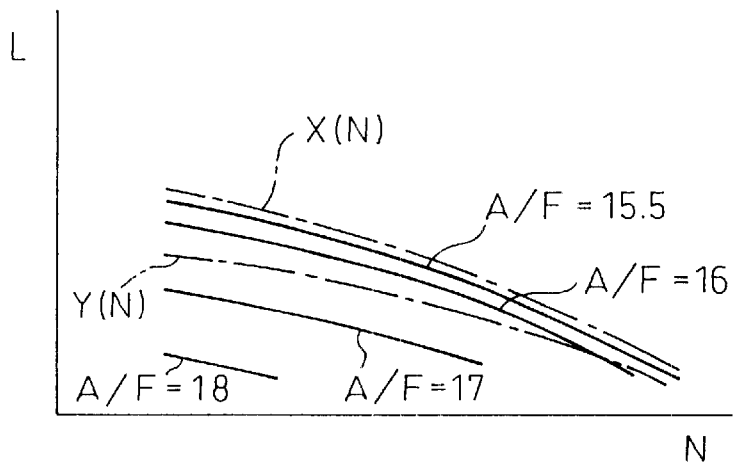
FIG. 14 is a view showing the air-fuel ratio in the first operating region (I)

FIG. 14 shows the air-fuel ratios A/F in the first operating region (I). In FIG. 14, the curves indicated by A/F=15.5, A/F=16, A/F=17, and A/F=18 shows respectively the cases in that the air-fuel ratios are 15.5, 16, 17, and 18. The air-fuel ratio between two of the curves is defined by the proportional allotment. As shown in FIG. 14, in the first operating region (I), the air-fuel ratio is lean and the more the air-fuel ratio is lean, the lower the required engine load (L) becomes.

That is, the amount of generated heat in the combustion decreases along with the decrease of the required engine load (L). Therefore, even if the EGR rate decreases along with the decrease of the required engine load (L), the low temperature combustion can be carried out. When the EGR rate decreases, the air-fuel ratio becomes large. Therefore, as shown in FIG. 14, the air-fuel ratio A/F increases along with the decrease of the required engine load (L). The larger the air-fuel ratio becomes, the more the fuel consumption improves. Accordingly, in the present embodiment, the air-fuel ratio A/F increases along with the decrease in the required engine load (L) such that the air-fuel ratio is made lean as much as possible.

Figure 15A:
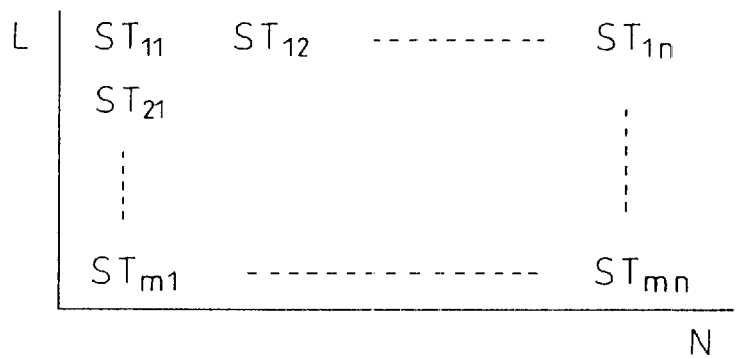
FIG. 15(A) is a view showing the target opening degree of the throttle valve.
Figure 15B:
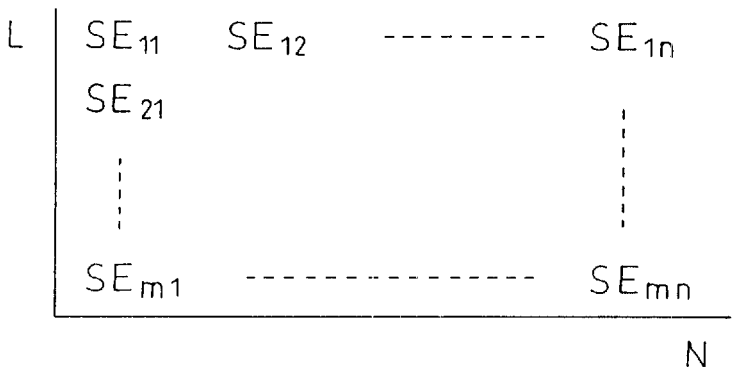
FIG. 15(B) is a view showing the target opening degree of the EGR control valve.

A target opening degree (ST) of the throttle valve 16 required to make the air-fuel ratio the target air-fuel ratio shown in FIG. 14 is memorized in ROM 32 of the electronic control unit as a map in which it is a function of the required engine load (L) and the engine speed (N) shown in FIG. 15(A). A target opening degree (SE) of the EGR control valve 23 required to make the air-fuel ratio the target air-fuel ratio shown in FIG. 14 is memorized in ROM 32 of the electronic control unit as a map in which it is a function of the required engine load (L) and the engine speed (N) shown in FIG. 15(B).

Figure 16:
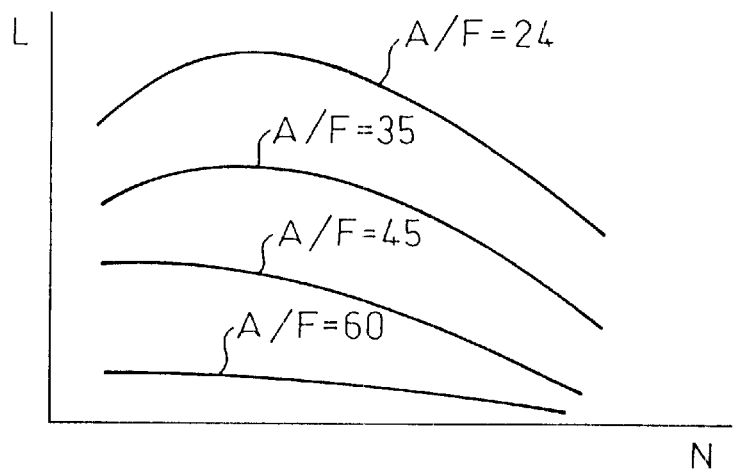
FIG. 16 is a view showing the air-fuel ratio in the second operating region (II)
Figure 17A:
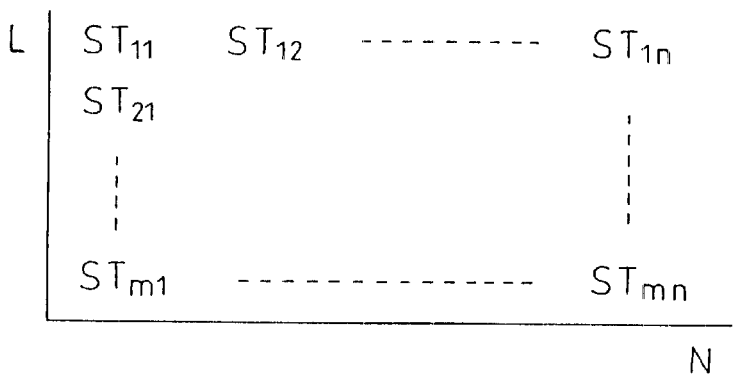
FIG. 17(A) is a view showing the target opening degree of the throttle valve.
Figure 17B:
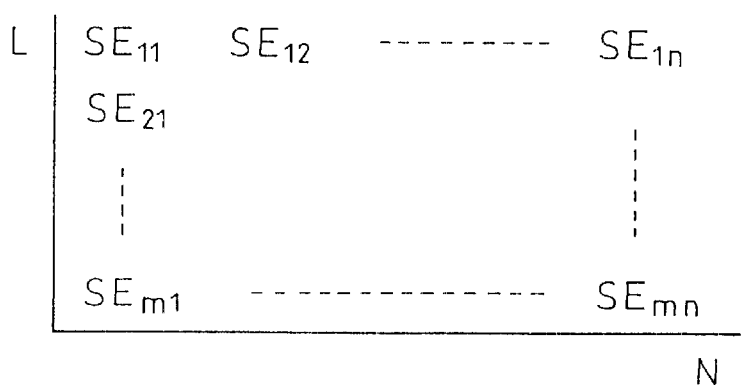
FIG. 17(B) is a view showing the target opening degree of the EGR control valve.

FIG. 16 shows target air-fuel ratios when the second combustion, i.e., the normal combustion as usual is carried out. In FIG. 16, the curves indicated by A/F=24, A/F=35, A/F=45, and A/F=60 shows respectively the cases in that the target air-fuel ratios are 24, 35, 45, and 60. A target opening degree (ST) of the throttle valve 16 required to make the air-fuel ratio the target air-fuel ratio is memorized in ROM 32 of the electronic control unit as a map in which it is a function of the required engine load (L) and the engine speed (N) shown in FIG. 17(A). A target opening degree (SE) of the EGR control valve 23 required to make the air-fuel ratio the target air-fuel ratio is memorized in ROM 32 of the electronic control unit as a map in which it is a function of the required engine load (L) and the engine speed (N) shown in FIG. 17(B).

Thus, in the diesel engine of the present embodiment, the first combustion, i.e., the low temperature combustion and the second combustion, i.e., the normal combustion are changed over on the basis of the amount of depression (L) of the accelerator pedal 40 and the engine speed (N). In each combustion, the opening degrees of the throttle valve 16 and the EGR control valve are controlled on the basis of the maps shown in FIGS. 15 and 17.

Figure 18:
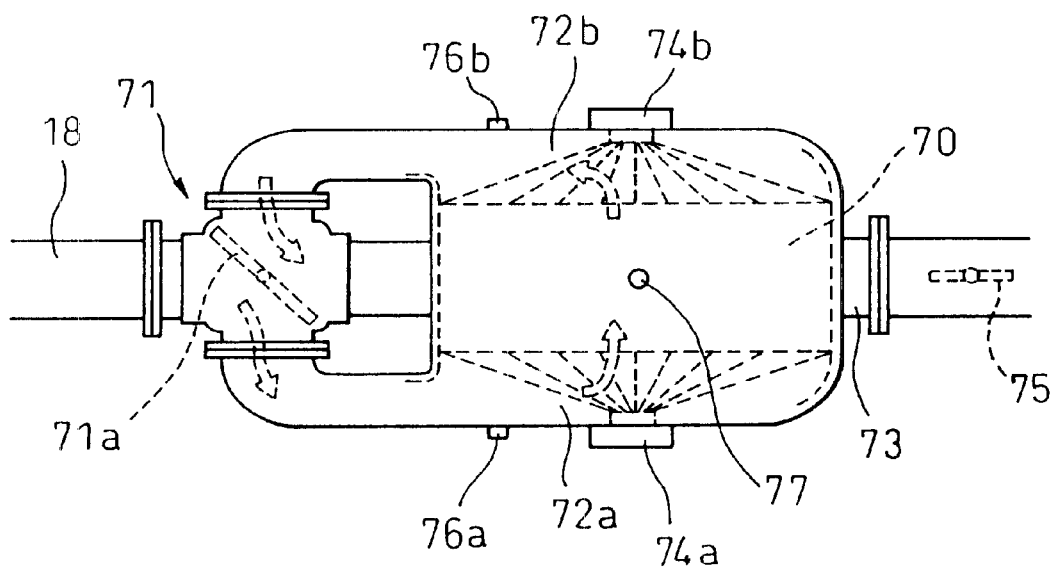
FIG. 18 is a plan view showing near the changeover portion and the particulate filter in the exhaust system according to an embodiment.
Figure 19:
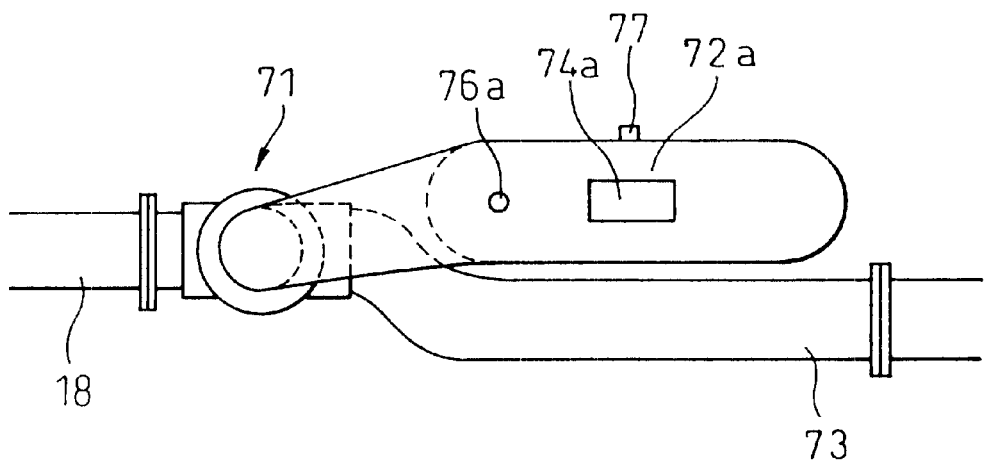
FIG. 19 is a side view of FIG. 18.

FIG. 18 is a plan view illustrating a device for purifying the exhaust gas, and FIG. 19 is a side view thereof. The device comprises a changeover portion 71 connected to the downstream of the exhaust manifold 17 via an exhaust pipe 18, a particulate filter 70, a first connecting portion 72a for connecting one side of the particulate filter 70 to the changeover portion 71, a second connecting portion 72b for connecting the other side of the particulate filter 70 to the changeover portion 71, and an exhaust passage 73 on the downstream of the changeover portion 71. The changeover portion 71 comprises a valve body 71a that shuts off the flow of exhaust gas in the changeover portion 71. The valve body 71a is driven by a negative pressure actuator, a step motor or the like. At one shut-off position of the valve body 71a, the upstream side in the changeover portion 71 is communicated with the first connecting portion 72a and the downstream side therein is communicated with the second connecting portion 72b, and thus the exhaust gas flows from one side of the particulate filter 70 to the other side thereof as shown by arrows in FIG. 18.

Figure 20:
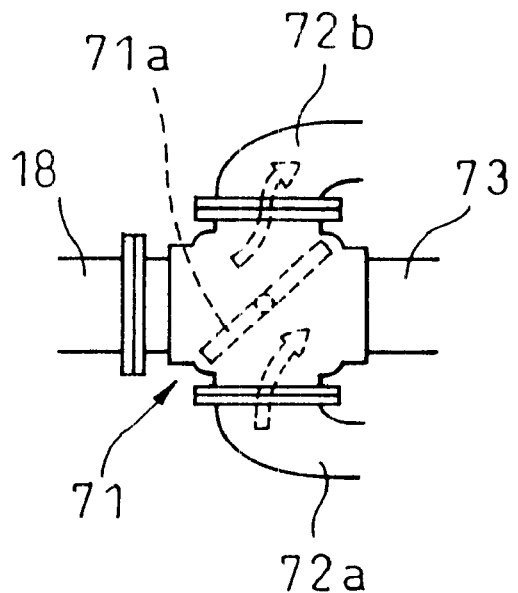
FIG. 20 is a view showing the other shut-off position of the valve body in the changeover portion which is different from that in FIG. 18.

FIG. 20 illustrates another shut-off position of the valve body 71a. At this shut-off position, the upstream side in the changeover portion 71 is communicated with the second connecting portion 72b and the downstream side in the changeover portion 71 is communicated with the first connecting portion 72a, and thus the exhaust gas flows from the other side of the particulate filter 70 to the one side thereof as shown by arrows in FIG. 20. Thus, by changing over the valve body 71a, the direction of the exhaust gas flowing into the particulate filter 70 can be reversed, i.e., the exhaust gas upstream side and the exhaust gas downstream side of the particulate filter 70 can be reversed.

Thus, the present device for purifying the exhaust gas can reverse the exhaust gas upstream side and the exhaust gas downstream side of the particulate filter by a very simple structure. Further, the particulate filter requires a large opening area to facilitate the introduction of the exhaust gas. In the device, the particulate filter having a large opening area can be used without making it difficult to mount it on the vehicle as shown in FIGS. 18 and 19.

Further, as shown in FIG. 18, the device for purifying the exhaust gas comprises reducing agent supplying units 74a and 74b that can supply reducing agent, as fuel, to both sides of the particulate filter in a wide area. Further, in a position that is always on the downstream side of the particulate filter 70 irrespective of the reversing of the upstream side and the downstream side of the particulate filter 70, an exhaust throttle valve 75 of which the opening degree can be controlled by a step motor or the like is arranged. Further, a first pressure sensor 76a is provided to detect an exhaust pressure in the first connecting portion 72a and a second pressure sensor 76b is provided to detect an exhaust pressure in the second connecting portion 72b. The outputs of these pressure sensors 76a and 76b are input to the input port 35 of the above electronic control unit 30 via each A/D converter (not shown). Further, a temperature sensor 77 is provided to detect a temperature of the particulate filter and the output thereof is also input to the input port 35 via an A/D converter (not shown).

Figure 22A:
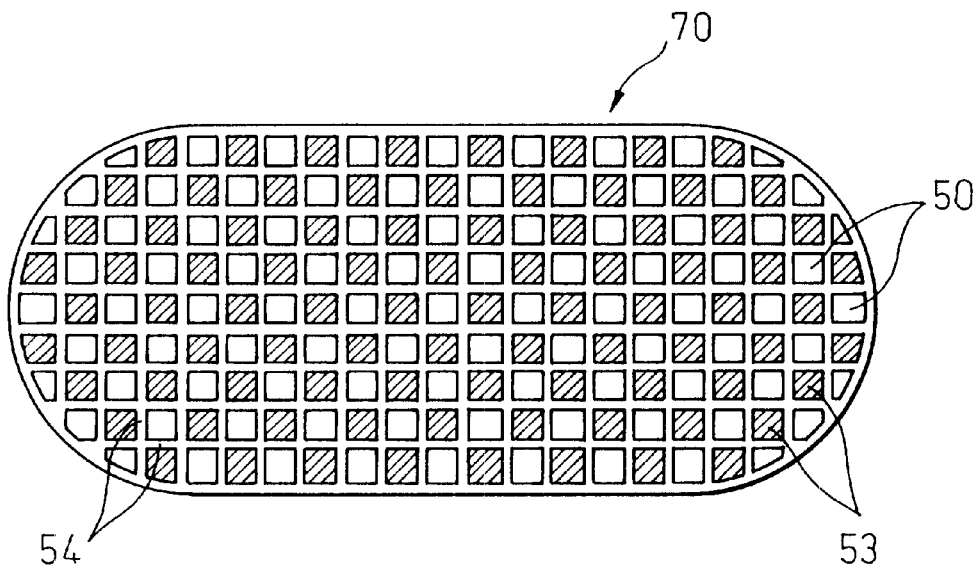
FIG. 22(A) is a front view showing the structure of the particulate filter.
Figure 22B:
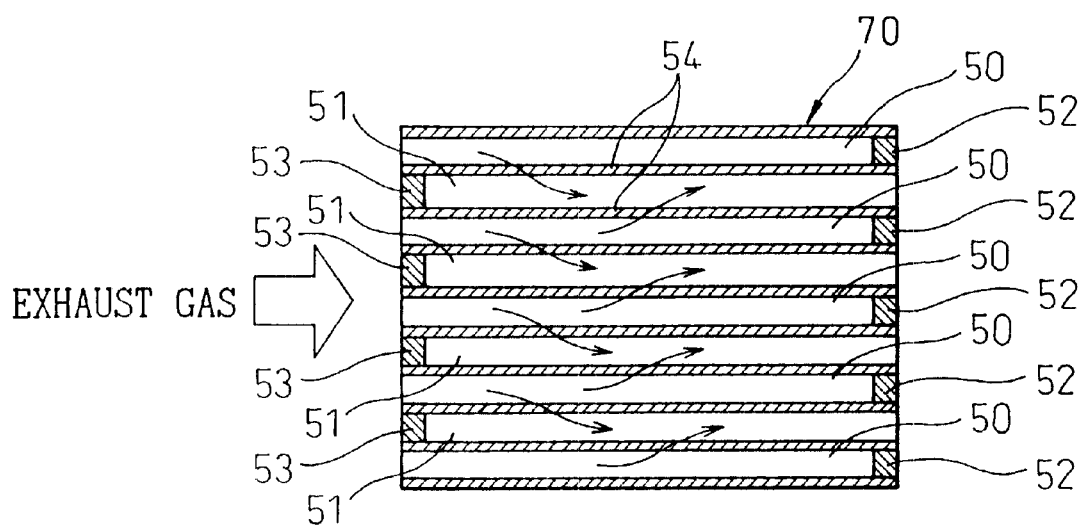
FIG. 22(B) is a side sectional view showing the structure of the particulate filter.

FIG. 22 shows the structure of the particulate filter 70, wherein FIG. 22(A) is a front view of the particulate filter 70 and FIG. 22(B) is a side sectional view thereof. As shown in these figures, the particulate filter 70 has an elliptic shape, and is, for example, the wall-flow type of a honeycomb structure formed of a porous material such as cordierite, and has many spaces in the axial direction divided by many partition walls 54 extending in the axial direction. One of any two neighboring spaces is closed by a plug 52 on the exhaust gas downstream side, and the other one is closed by a plug 53 on the exhaust gas upstream side. Thus, one of the two neighboring spaces serves as an exhaust gas flow-in passage 50 and the other one serves as an exhaust gas flow-out passage 51, causing the exhaust gas to necessarily pass through the partition wall 54 as indicated by arrows in FIG. 22(B). The particulates contained in the exhaust gas are much smaller than the pores of the partition wall 54, but collide with and are trapped on the exhaust gas upstream side surface of the partition wall 54 and the pores surface in the partition wall 54. Thus, each partition wall 54 works as a trapping wall for trapping the particulates. In the present particulate filter 70, in order to oxidize and remove the trapped particulates, an active-oxygen releasing agent and a noble metal catalyst, which will be explained below, are carried on both side surfaces of the partition wall 54 and preferably also on the pores surfaces in the partition wall 54.

The active-oxygen releasing agent releases active oxygen to promote the oxidation of the particulates and, preferably, takes in and holds oxygen when excessive oxygen is present in the surroundings and releases the held oxygen as active-oxygen when the oxygen concentration in the surroundings drops.

As the noble metal catalyst, platinum Pt is usually used. As the active-oxygen releasing agent, there is used at least one selected from alkali metals such as potassium K, sodium Na, lithium Li, cesium Cs, and rubidium Rb, alkali earth metals such as barium Ba, calcium Ca, and strontium Sr, rare earth elements such as lanthanum La and yttrium Y, and transition metals.

As an active-oxygen releasing agent, it is desired to use an alkali metal or an alkali earth metal having an ionization tendency stronger than that of calcium Ca, i.e., to use potassium K, lithium Li, cesium Cs, rubidium Rb, barium Ba, or strontium Sr.

Next, explained below is how the trapped particulates on the particulate filter are oxidized and removed by the particulate filter carrying such an active-oxygen releasing agent with reference to the case of using platinum Pt and potassium K. The particulates are oxidized and removed in the same manner even by using another noble metal and another alkali metal, an alkali earth metal, a rear earth element, or a transition metal.

In a diesel engine, the combustion usually takes place in an excess air condition and, hence, the exhaust gas contains a large amount of excess air. That is, if the ratio of the air to the fuel supplied to the intake system and to the combustion chamber is referred to as an air-fuel ratio of the exhaust gas, the air-fuel ratio is lean. Further, NO is generated in the combustion chamber and, hence, the exhaust gas contains NO. Further, the fuel contains sulfur S and sulfur S reacts with oxygen in the combustion chamber to form $SO_2$. Accordingly, the exhaust gas containing excessive oxygen, NO, and $SO_2$ flows into the exhaust gas upstream side of the particulate filter 70.

Figure 23A:
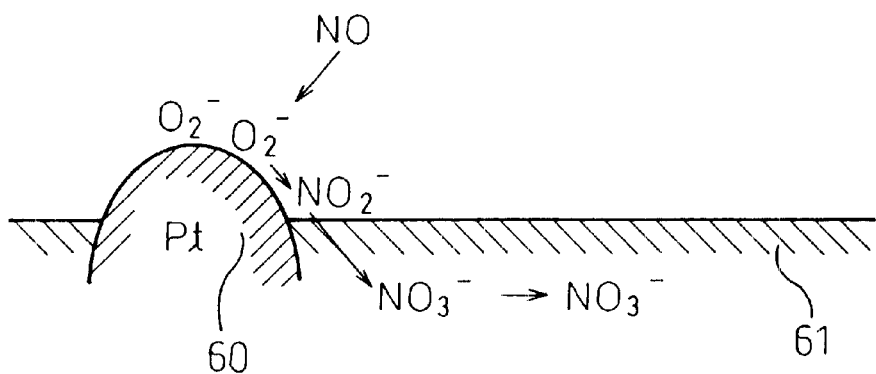
FIGS. 23(A) and 23(B) are views explaining the oxidizing action of the particulates.
Figure 23B:
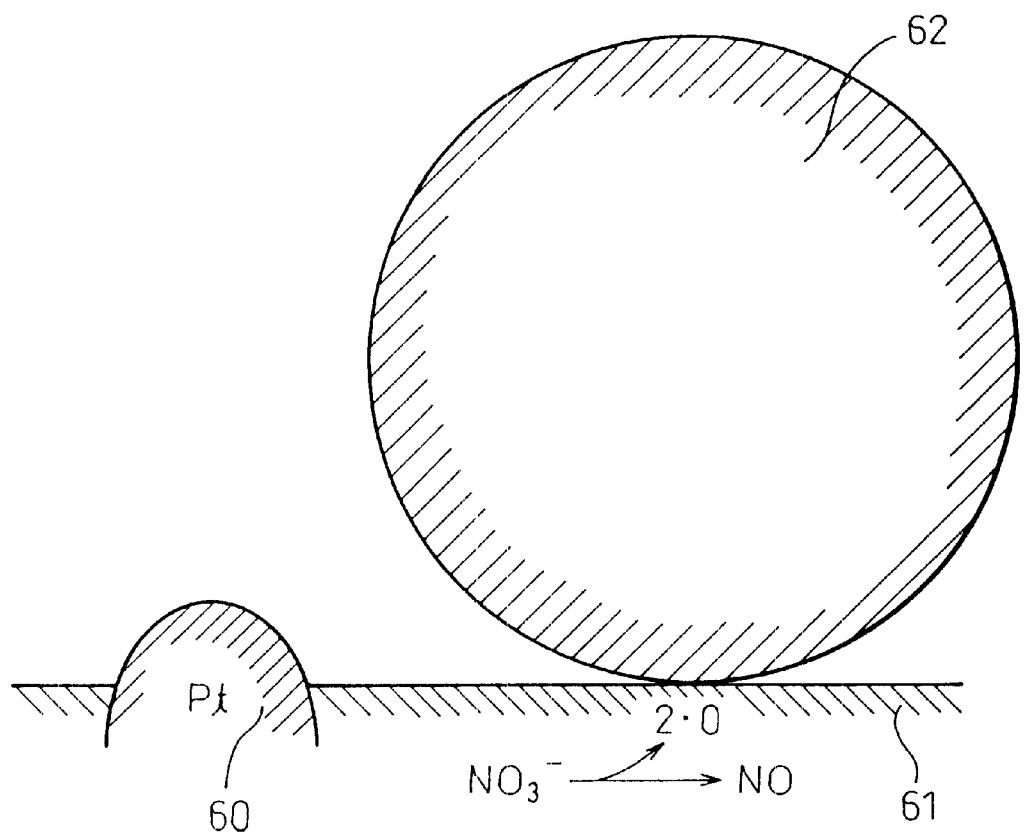

FIGS. 23(A) and 23(B) are enlarged views schematically illustrating the surface of the particulate filter 70 with which the exhaust gas comes in contact. In FIGS. 23(A) and 23(B), reference numeral 60 denotes a particle of platinum Pt and 61 denotes the active-oxygen releasing agent containing potassium K.

As described above, the exhaust gas contains a large amount of excess oxygen. When the exhaust gas contacts with the exhaust gas contact surface of the particulate filter, oxygen $O_2$ adheres onto the surface of platinum Pt in the form of $O_2^-$ or $O^{2-}$ as shown in FIG. 23(A). On the other hand, NO in the exhaust gas reacts with $O_2^-$ or $O^{2-}$ on the surface of platinum Pt to produce $NO_2$ ($2NO+O_2 \rightarrow 2NO_2$). Next, a part of the produced $NO_2$ is absorbed in the active-oxygen releasing agent 61 while being oxidized on platinum Pt, and diffuses in the active-oxygen releasing agent 61 in the form of nitric acid ions $NO_3^-$ while being combined with potassium K to form potassium nitrate $KNO_3$ as shown in FIG. 23(A). Thus, in the present embodiment, $NO_X$ contained in the exhaust gas is absorbed in the particulate filter 70 and an amount thereof released into the atmosphere can be decreased, that is, the active-oxygen releasing agent also functions a $NO_X$ absorbent.

Further, the exhaust gas contains $SO_2$, as described above, and $SO_2$ also is absorbed in the active-oxygen releasing agent 61 due to a mechanism similar to that of the case of NO. That is, as described above, oxygen $O_2$ adheres on the surface of platinum Pt in the form of $O_2^-$ or $O^{2-}$, and $SO_2$ in the exhaust gas reacts with $O_2^-$ or $O^{2-}$ on the surface of platinum Pt to produce $SO_3$. Next, a part of the produced $SO_3$ is absorbed in the active-oxygen releasing agent 61 while being oxidized on the platinum Pt and diffuses in the active-oxygen releasing agent 61 in the form of sulfuric acid ion $SO_4^{2-}$ while being combined with potassium K to produce potassium sulfate $K_2SO_4$. Thus, potassium nitrate $KNO_3$ and potassium sulfate $K_2SO_4$ are produced in the active-oxygen releasing agent 61.

The particulates in the exhaust gas adhere on the surface of the active-oxygen releasing agent 61 carried by the particulate filter 70 as designated at 62 in FIG. 23(B). At this time, the oxygen concentration drops on the surface of the active-oxygen releasing agent 61 with which the particulate 62 is in contact. As the oxygen concentration drops, there occurs a difference in the concentration from the active-oxygen releasing agent 61 having a high oxygen concentration and, thus, oxygen in the active-oxygen releasing agent 61 tends to migrate toward the surface of the active-oxygen releasing agent 61 with which the particulate 62 is in contact. As a result, potassium nitrate $KNO_3$ produced in the active-oxygen releasing agent 61 is decomposed into potassium K, oxygen O and NO, whereby oxygen O migrates toward the surface of the active-oxygen releasing agent 61 with which the particulate 62 is in contact, and NO is emitted to the outside from the active-oxygen releasing agent 61. NO emitted to the outside is oxidized on platinum Pt on the downstream side and is absorbed again in the active-oxygen releasing agent 61.

At this time, further, potassium sulfate $K_2SO_4$ produced in the active-oxygen releasing agent 61 is also decomposed into potassium K, oxygen O, and $SO_2$, whereby oxygen O migrates toward the surface of the active-oxygen releasing agent 61 with which the particulate 62 is in contact, and $SO_2$ is emitted to the outside from the active-oxygen releasing agent 61. $SO_2$ released to the outside is oxidized on platinum Pt on the downstream side and is absorbed again in the active-oxygen releasing agent 61. Here, however, potassium sulfate $K_2SO_4$ is stable and releases less active-oxygen than potassium nitrate $KNO_3$.

On the other hand, oxygen O migrating toward the surface of the active-oxygen releasing agent 61 with which the particulate 62 is contact is the one decomposed from such compounds as potassium nitrate $KNO_3$ or potassium sulfate $K_2SO_4$. Oxygen O decomposed from the compound has a high level of energy and exhibits a very high activity. Therefore, oxygen migrating toward the surface of the active-oxygen releasing agent 61, with which the particulate 62 is in contact, is active-oxygen O. Upon coming into contact with active-oxygen O, the particulate 62 is oxidized without producing luminous flame for a short time, for example, a few minutes or a few tens of minutes. Further, active-oxygen to oxidize the particulate 62 is also released when NO and $SO_2$ are absorbed in the active-oxygen releasing agent 61. That is, it can be considered that $NO_X$ diffuses in the active-oxygen releasing agent 61 in the form of nitric acid ions $NO_3^-$ while being combined with oxygen atoms and to be separated from oxygen atoms, and during this time, active-oxygen is produced. The particulates 62 is also oxidized by this active-oxygen. Further, the particulates adhered on the particulate filter 70 are not oxidized only by active-oxygen, but also by oxygen contained in the exhaust gas.

The higher the temperature of the particulate filter becomes, the more the platinum Pt and the active-oxygen releasing agent 61 are activated. Therefore, the higher the temperature of the particulate filter becomes, the larger the amount of active-oxygen O released from the active-oxygen releasing agent 61, per unit time, becomes. Further, naturally, the higher the temperature of particulates is, the easier the particulates are oxidized. Therefore, the amount of particulates that can be oxidized and removed without producing luminous flame on the particulate filter per a unit time increases with along an increase in the temperature of the particulate filter.

Figure 24:
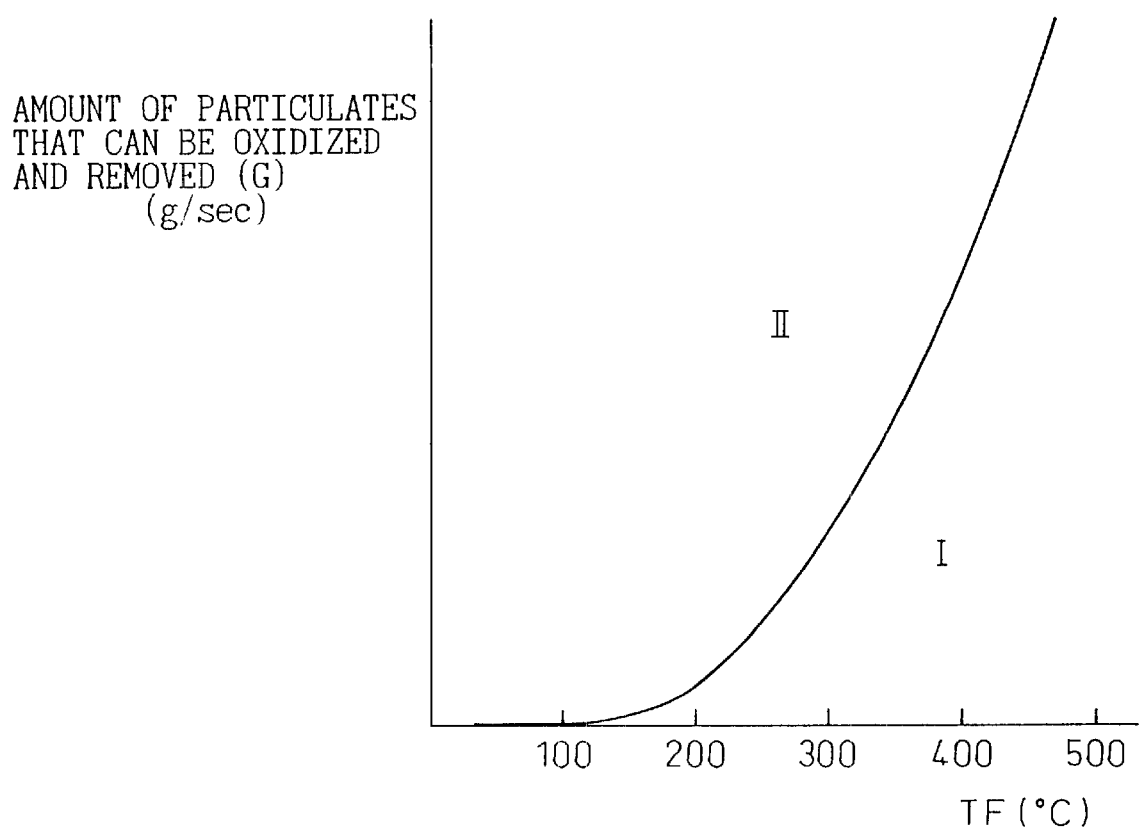
FIG. 24 is a view showing the relationship between the amount of particulates that can be oxidized and removed and the temperature of the particulate filter.

The solid line in FIG. 24 shows the amount of particulates (G) that can be oxidized and removed without producing luminous flame per a unit time. In FIG. 24, the abscissa represents the temperature (TF) of the particulate filter. Here, FIG. 24 shows the case that the unit time is 1 second, that is, the amount of particulates (G) that can be oxidized and removed per 1 second. However, any time such as 1 minute, 10 minutes, or the like can be selected as a unit time. For example, in the case that 10 minutes is used as a unit time, the amount of particulates (G) that can be oxidized and removed per a unit time represents the amount of particulates (G) that can be oxidized and removed per 10 minutes. In also this case, the amount of particulates (G) that can be oxidized and removed without producing luminous flame increases along with the increase of the temperature of particulate filter 70 as shown in FIG. 24. The amount of particulates emitted from the combustion chamber per a unit time is referred to as an amount of emitted particulates (M). When the amount of emitted particulates (M) is smaller than the amount of particulates (G) that can be oxidized and removed, for example, the amount of emitted particulates (M) per 1 second is smaller than the amount of particulates (G) that can be oxidized and removed per 1 second or the amount of emitted particulates (M) per 10 minutes is smaller than the amount of particulates (G) that can be oxidized and removed per 10 minutes, that is, in the area (I) of FIG. 24, the particulates emitted from the combustion chamber are all oxidized and removed without producing luminous flame, successively, on the particulate filter 70 for a short time.

Figure 25A:
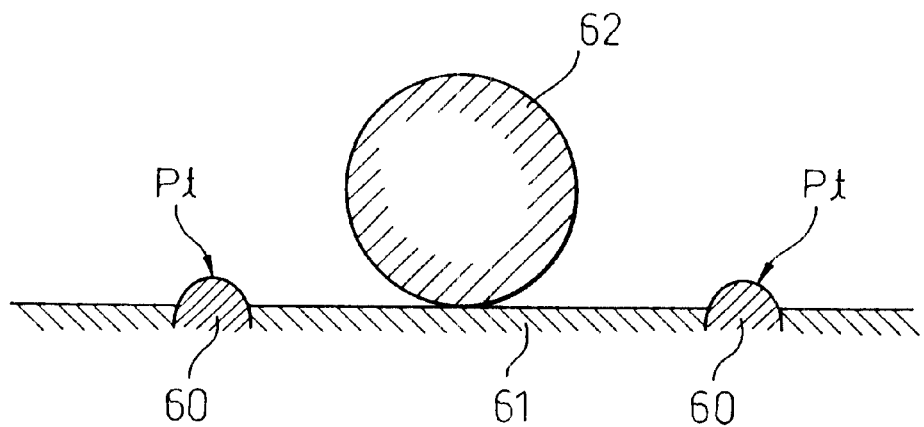
FIGS. 25(A), 25(B), and 25(C) are views explaining the depositing action of the particulates.
Figure 25B:
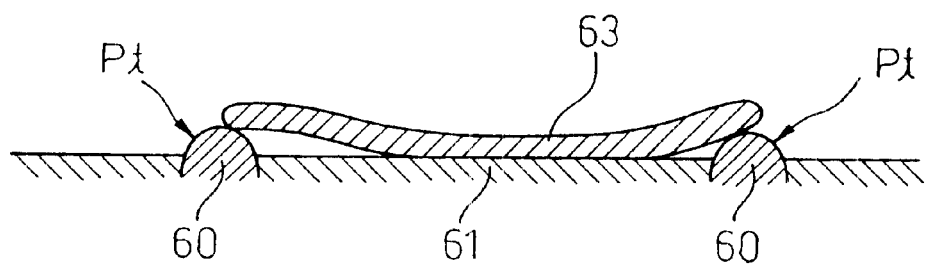
Figure 25C:
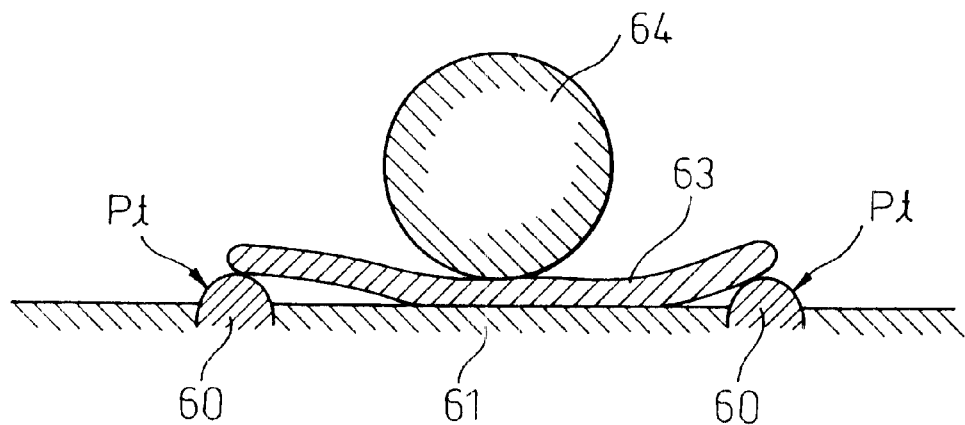

On the other hand, when the amount of emitted particulates (M) is larger than the amount of particulates that can be oxidized and removed (G), that is, in the area (II) of FIG. 24, the amount of active-oxygen is not sufficient for all particulates to be oxidized and removed successively. FIGS. 25(A) to (C) illustrate the manner of oxidation of the particulates in such a case.

That is, in the case that the amount of active-oxygen is lacking for oxidizing all particulates, when the particulates 62 adheres on the active-oxygen releasing agent 61, only a part of the particulates is oxidized as shown in FIG. 25(A), and the other part of the particulates that was not oxidized sufficiently remains on the exhaust gas upstream surface of the particulate filter. When the state where the amount of active-oxygen is lacking continues, a part of the particulates that was not oxidized remains on the exhaust gas upstream surface of the particulate filter successively. As a result, the exhaust gas upstream surface of the particulate filter is covered with the residual particulates 63 as shown in FIG. 25(B).

The residual particulates 63 is gradually transformed into carbonaceous matter that can hardly be oxidized. Further, when the exhaust gas upstream surface is covered with the residual particulates 63, the action of platinum Pt for oxidizing NO and $SO_2$, and the action of the active-oxygen releasing agent 61 for releasing active-oxygen are suppressed. The residual particulates 63 can be gradually oxidized over a relative long period. However, as shown in FIG. 25(C), other particulates 64 deposit on the residual particulates 63 one after the other, and when the particulates are deposited so as to laminate, even if they are the easily oxidized particulates, these particulates may not be oxidized since these particulates are separated away from platinum Pt or from the active-oxygen releasing agent. Accordingly, other particulates deposit successively on these particulates 64. That is, when the state where the amount of emitted particulates (M) is larger than the amount of particulates that can be oxidized and removed (G) continues, the particulates deposit to laminate on the particulate filter.

Thus, in the area (I) of FIG. 24, the particulates are oxidized and removed without producing luminous flame for the short time and in the area (II) of FIG. 24, the particulates are deposited to laminate on the particulate filter. Therefore, the deposition of the particulates on the particulate filter can be prevented if the relationship between the amount of emitted particulates (M) and the amount of particulates that can be oxidized and removed (G) is in the area (I). As a result, a pressure loss of the exhaust gas in the particulate filter hardly changes and is maintained at a minimum pressure loss value that is nearly constant. Thus, the decrease of the engine output can be maintained as low as possible. However, this is not always realized, and the particulates may deposit on the particulate filter if nothing is done.

Figure 26:
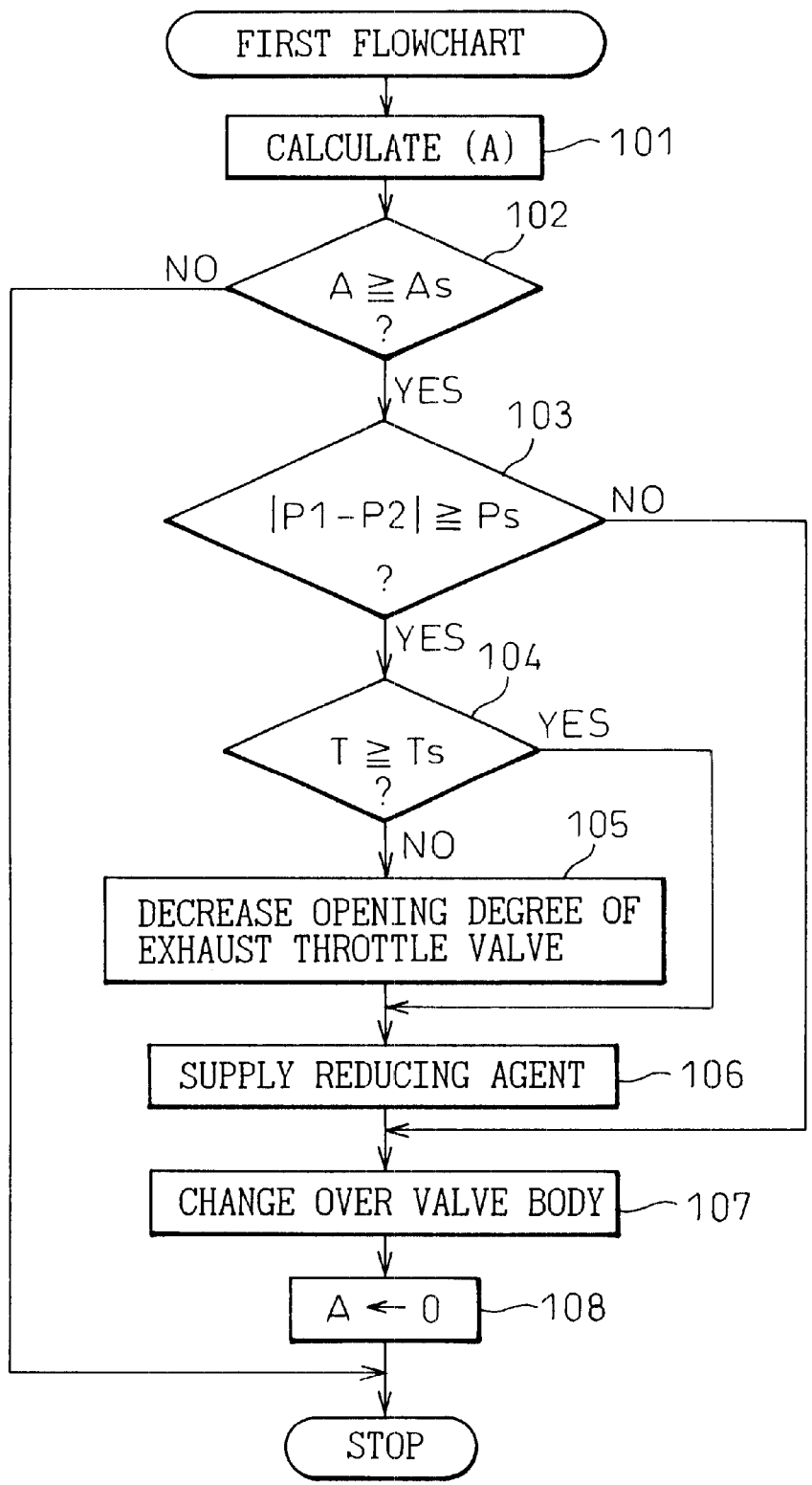
FIG. 26 is a first flowchart for preventing the deposition of the particulates on the particulate filter.

In the present embodiment, to prevent the deposition of particulates on the particulate filter, the above electronic control unit 30 controls the reducing agent supplying units 74a and 74b, the valve body 71a, and the exhaust throttle valve 75 according to a first flowchart shown in FIG. 26. The present flowchart is repeated every a predetermined time. At step 101, the integrated running distance (A) is calculated. The integrated running distance (A) is one that is integrated from when the valve body 71 had been changed over. Next, at step 102, it is determined if the integrated running distance (A) is larger than a predetermined running distance (As). When the result is negative, the routine is stopped. However, when the result is positive, the routine goes to step 103. At step 103, the absolute value of the difference between an exhaust pressure (P1) on the one side of the particulate filter 70, for example, an exhaust pressure in the first connecting portion 72a detected by the first pressure sensor 76a and an exhaust pressure (P2) on the other side of the particulate filter 70, for example, an exhaust pressure in the second connecting portion 72b detected by the second pressure sensor 76b is calculated and it is determined if the absolute value is larger than a predetermined pressure difference (Ps). When the result is negative, the routine goes to step 107 and the valve body 71a is changed over, that is, the upstream side and the downstream side of the particulate filter are reversed. Next, at step 108, the integrated value (A) is reset to 0 and the routine is stopped.

Figure 27A:
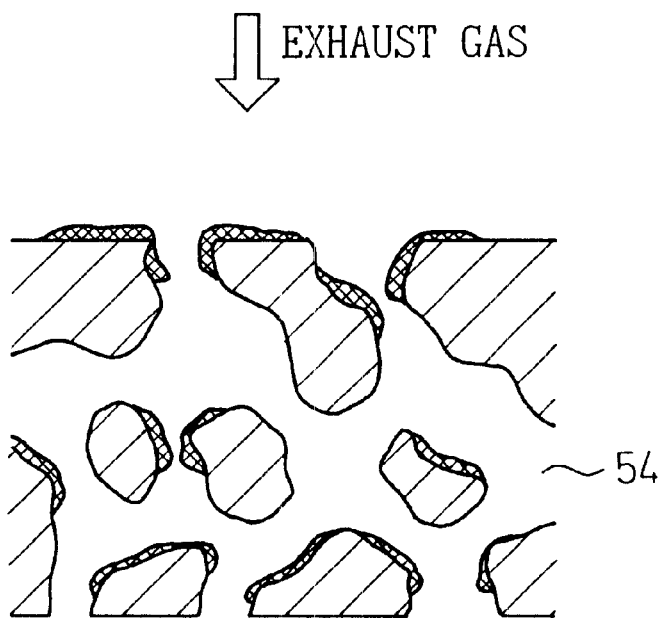
FIGS. 27(A) and 27(B) are enlarged sectional views of the partition wall of the particulate filter.
Figure 27B:
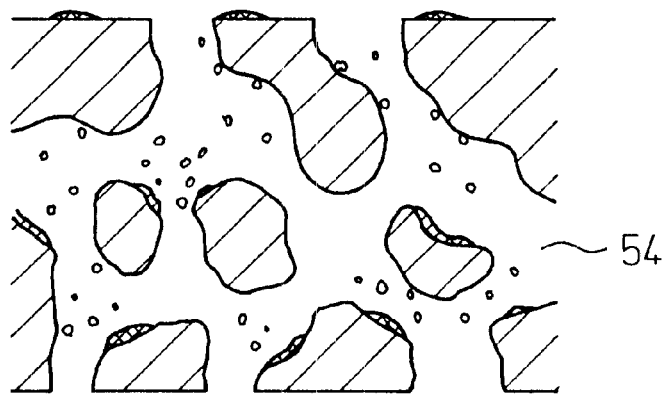

FIG. 27 is an enlarged sectional view of the partition wall 54 of the particulate filter. While the vehicle travels over the predetermined running distance (As), the engine operation in the area (II) of the FIG. 24 can be carried out. Thus, the particulates collide with and are trapped by the exhaust gas upstream surface of the partition wall 54 and the exhaust gas opposing surface in the pores therein, i.e., one of the trapping surfaces of the partition wall 54, and are oxidized and removed by active-oxygen released from the active-oxygen releasing agent, but the particulates can remain for the insufficient oxidization as shown in FIG. 27(A). At this stage, the exhaust resistance of the particulate filter does not have a bad influence on the traveling of the vehicle. However, if the particulates deposit more, problems, in which the engine output drops considerably, and the like, occur. If at this stage, the upstream side and the downstream side of the particulate filter are reversed as mentioned above, no particulates deposit again on the residual particulates on one of the trapping surfaces of the partition wall and thus the residual particulates can be gradually oxidized and removed by active-oxygen released from the one of the trapping surfaces. Further, in particular, the residual particulates in the pores in the partition wall are easily smashed into fine pieces by the exhaust gas flow in the reverse direction as shown in FIG. 27(B), and they mainly move through the pores toward the downstream side.

Accordingly, many of the particulates smashed into fine pieces diffuse in the pore in the partition wall, and they contact directly the active-oxygen releasing agent carried on the pores surface and are oxidized and removed. Thus, if the active-oxygen releasing agent is also carried on the pores surface in the partition wall, the residual particulates can be very easily oxidized and removed. On the other trapping surface that is now on the upstream side, as the flow of the exhaust gas is reversed, i.e., the exhaust gas upstream surface of the partition wall 54 and the exhaust gas opposing surface in the pores therein to which the exhaust gas mainly impinges (of the oppose side of one of the trapping surfaces), the particulates in the exhaust gas adhere newly thereto and are oxidized and removed by active-oxygen released from the active-oxygen releasing agent. In this oxidization, a part of the active-oxygen released from the active-oxygen releasing agent on the other trapping surface moves to the downstream side with the exhaust gas, and it is made to oxidize and remove the particulates that still remain on one of the trapping surfaces despite of the reversed flow of the exhaust gas.

That is, the residual particulates on one of the trapping surfaces are exposed to not only active-oxygen released from this trapping surface but also the remainder of the active-oxygen used for oxidizing and removing the particulates on the other trapping surface by reversing the flow of the exhaust gas. Therefore, even if some particulate deposits laminate on one of the trapping surfaces of the partition wall of the particulate filter when the exhaust gas flow is reversed, active-oxygen arrives at the deposited particulates and no particulates deposit again on the deposited particulates due to the reversed flow of the exhaust gas and thus the deposited particulates are gradually oxidized and removed and it can be oxidized and removed sufficiently for some period till the next reversal of the exhaust gas. Of course, by alternately using the one trapping surface and the other trapping surface of the partition wall, the amount of trapped particulates on each trapping surface is smaller than that of a particulate filter in which the single trapping surface always traps the particulates. This facilitates oxidizing and removal of the trapped particulates on the trapping surface.

However, in case that, while the vehicle travels over predetermined running distance, the engine operation in the region (II) of FIG. 24 is frequently carried out, an amount of particulates larger than that shown in FIG. 27(A) can deposit on the particulate filter. In particular, when a large amount of particulates deposit on the upstream surface of the partition wall 54, if the exhaust gas flow is reversed, the deposited particulates exfoliate from this surface (that is now the downstream surface) before they are oxidized and removed, as mentioned above, and thus a relative large amount of particulates may be emitted into the atmosphere.

In the first flowchart, to prevent this, when the result at step 103 is positive, it is determined that a predetermined amount of particulates is discharged from the particulate filter and the routine goes to step 104. At step 104, it is determined if a temperature (T) of the particulate filter detected by the temperature sensor 77 is higher than a predetermined temperature (Ts). The temperature (T) of the particulate filter may be assumed on the basis of the amount of the exhaust gas flowing into the particulate filter and the temperature thereof. The predetermined temperature (Ts) is the activation temperature of an oxidization catalyst such as platinum Pt carried on the particulate filter. When the result at step 104 is negative, the routine goes to step 105 and the opening degree of the exhaust throttle valve 75 is made to decrease from the fully open state. Therefore, the heat of the exhaust gas acts effectively on the particulate filter and thus at least the temperature of the exhaust gas inlet portion (the exhaust gas inlet side portion of each partition wall 54) of the particulate filter is made to rise to the activation temperature of the oxidization catalyst.

Next, at step 106, a reducing agent is supplied to the particulate filter by one of the reducing agent supplying units 74a or 74b now on the exhaust gas upstream side. Therefore, in the exhaust gas inlet portion of the particulate filter, the reducing agent burns by the oxidization catalyst such as platinum Pt sufficiently and the burned heat raises the temperature of the exhaust gas upstream surface of the partition wall of the particulate filter. At this time, if the temperature thereof is raised to about 600 degrees C., the deposited particulates ignite and burn naturally. Besides, even if the temperature thereof is not raised to about 600 degrees C., the amount of particulates that can be oxidized and removed of the particulate filter can be improved. In either case, the large amount of particulates deposited on the exhaust gas upstream surface of the partition wall can be oxidized and removed. Thereafter, at step 107, the valve body 71a is reversed and the residual particulates on the particulate filter can be oxidized and removed. At this time, it is prevented that a relative large amount of particulates exfoliate from the current exhaust gas downstream surface of the partition wall of the particulate filter and it is emitted into the atmosphere at once. In the first flowchart, only when the result at step 103 is negative, the reducing agent is supplied to the particulate filter. However, of course, if every time the valve body is reversed, once in a while before the valve body is reversed, or once in a while irrespective of the reversing of the valve body, the reducing agent is supplied, the relative large amount of particulates deposited on the exhaust gas upstream surface of the partition wall of the particulate filter can be oxidized and removed without the discharge thereof from the particulate filter.

When the result at step 104 is negative, i.e., when the temperature (T) of the particulate filter is higher than the activation temperature (Ts) of the oxidization catalyst, the opening degree of the exhaust throttle valve does not need to decrease, and the reducing agent is immediately supplied at step 106. The reducing agent is supplied directly to the particulate filter and thus the amount of reducing agent can be made a minimum. However, this does not limit the present invention. For example, the fuel injector of the engine may inject fuel in the exhaust stroke, the expansion stroke, or the intake stroke, and the unburned fuel, as a reducing agent, in the exhaust gas may be supplied to the exhaust gas inlet portion of the particulate filter. Besides, a reducing agent may be supplied to the exhaust system on the upstream side of the changeover portion 71.

Of course, the burning of the reducing agent on the exhaust gas inlet portion of the particulate filter does not only raise the temperature thereof but also the burned heat raises the temperature of the other portions of the particulate filter with the exhaust gas flow. Thus, the amount of particulates that can be oxidized and removed, of the whole of the particulate filter, increases. Therefore, at least a part of the residual and deposited particulates is oxidized and removed before the exhaust gas flow is reversed and the amount of residual and deposited particulates can be decreased.

In the first flowchart, the valve body is changed over every the predetermined running distance (As). Thus, even if the engine operation in the area (II) of FIG. 24 is frequently carried out during this time, the large amount of particulates do not deposit on the whole of the particulate filter and the deposited particulates do not transform into carbonaceous matter that can hardly be oxidized. Accordingly, as mentioned above, the residual and deposited particulates can be certainly oxidized and removed and, thus, problems in which the large amount of deposited particulate ignites and burns at once to melt the particulate filter by the burned heat thereof and the like does not occur. Of course, an opportunity when the valve body is reversed may not be every the above-mentioned predetermined running distance, may be every a predetermined time, and may be any opportunity before the large amount of particulates deposit on the whole of the particulate filter or the deposited particulates transform into carbonaceous matter that can be hardly oxidized.

Further, the diesel engine of the present embodiment changes over the first combustion and the second combustion. In the first combustion, the exhaust gas contains relatively large amounts of HC and CO, i.e., a relatively large amount of reducing agent. Accordingly, even if no reducing agent supplying unit is provided in the exhaust system, the first combustion can be used as reducing agent supplying means. That is, when the first combustion is carried out, the valve body may be changed over at least once in a while. Therefore, the burned heat of the reducing agent raises the amount of particulates that can be oxidized and removed always before the valve body is changed over and thus the particulates deposited on the exhaust gas upstream surface of the partition wall of the particulate filter can be oxidized and removed automatically or with the decrease of the opening degree of the exhaust throttle valve 75.

Further, the burning of the reducing agent by the oxidization catalyst makes the oxygen concentration of the exhaust gas drop. Accordingly, active-oxygen O is released at one time from the active-oxygen releasing agent 61 to the outside. Therefore, the deposited particulates become those that are easily oxidized by the large amount of active-oxygen released at one time and can be easily oxidized and removed thereby without a luminous flame. Thus, if the reducing agent is supplied to the particulate filter carrying the oxidization catalyst and the active-oxygen releasing agent, the temperature of the particulate filter rises by the burning of the reducing agent and the oxygen concentration of the surroundings drops thereby. This can make increase the amount of particulates that can be oxidized and removed of the particulate filter considerably, and functions as improving means for improving the amount of particulates that can be oxidized and removed of the particulate filter. Also, in the case that no oxidization catalyst is provided on the particulate filter, if the oxygen concentration in the exhaust gas is merely made lower, the amount of active-oxygen released from the active-oxygen releasing agent increases since the amount of particulates that can be oxidized and removed is made higher. Thus, this can be also used as improving means for improving the amount of particulates that can be oxidized and removed of the particulate filter.

Further, in the first flowchart, utilizing the difference in pressure between the exhaust gas upstream side and the exhaust gas downstream side of the particulate filter, it is determined that the relatively large amount of particulates deposits sufficiently to discharge the predetermined amount of particulates from the particulate filter when the exhaust gas flow is reversed. Besides, in this determination, observing the change of electric resistance on a predetermined partition wall of the particulate filter, the fact that the electric resistance decreases along with the deposition of the particulates thereon can be utilized, or the fact that a transmissivity or reflectivity of light on a predetermined partition wall of the particulate filter drops along with the deposition of the particulates thereon can be utilized.

Strictly speaking, the different pressure between the both sides of particulate filter changes in accordance with the pressure of the exhaust gas discharged from the combustion chamber every engine operating condition. Accordingly, in the determination of the deposition of the particulates, it is preferable to specify the engine operating condition.

Further, in the first flowchart, when it is determined that the relatively large amount of particulates deposits sufficiently to discharge the predetermined amount of particulates from the particulate filter when the exhaust gas flow is reversed, the temperature of the exhaust gas upstream side of the particulate filter is made higher by the supply of the reducing agent. Of course, in the case that no oxidization catalyst is carried on the particulate filter, the temperature of the exhaust gas upstream side of the particulate filter may be raised higher only by the decrease in the opening degree of the exhaust throttle valve without the supply of the reducing agent. Thus the amount of particulates that can be oxidized and removed is made to increase and the deposited particulates thereon can be oxidized and removed. Besides, the temperature of the exhaust gas may be raised higher by the delay of ignition timing so that the temperature of the exhaust gas upstream side of the particulate filter rises and thus the amount of particulates that can be oxidized and removed is made to increase. Besides, these two facts may be combined.

Figure 28:
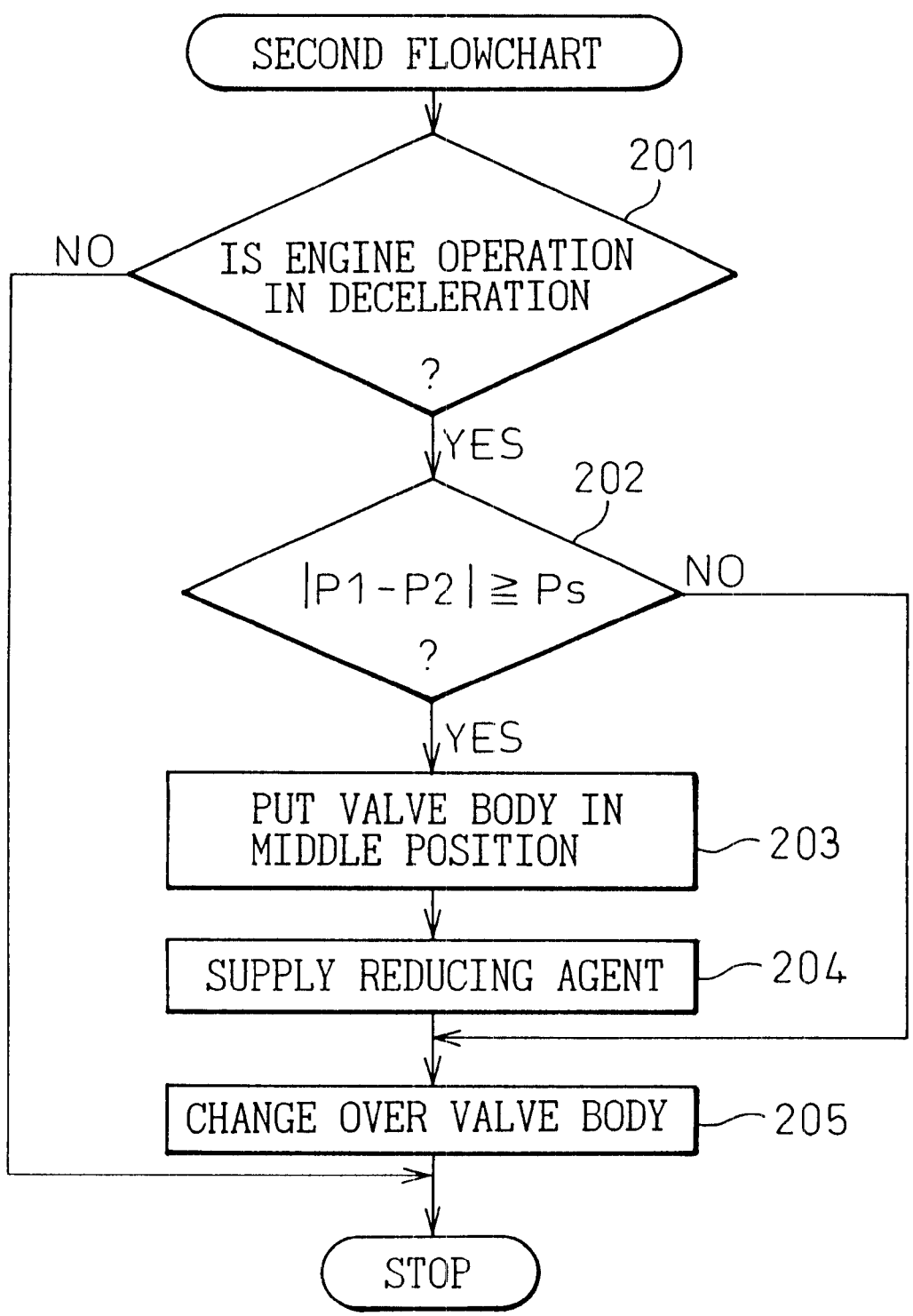
FIG. 28 is a second flowchart for preventing the deposition of the particulates on the particulate filter.

FIG. 28 is a second flowchart carried out instead of the first flowchart. The present flowchart is repeated every predetermined time. First, at step 201, it is determined if the engine operation is deceleration. In this determination, a signal of a fuel-cut, a signal of releasing the accelerator pedal, a signal of depressing the brake pedal or the like can be utilized.

When the result at step 201 is negative, the routine is stopped. On the other hand, when it is determined that the engine operation is deceleration at step 201, the routine goes to step 202, the same as the first flowchart, and it is determined if the relatively large amount of particulates deposits sufficiently to discharge the predetermined amount of particulates from the particulate filter when the exhaust gas flow is reversed.

When the result is negative, the routine goes to step 205 and the valve body is changed over. Thus, the exhaust gas upstream side and the exhaust gas downstream side of the particulate filter are reversed and the deposited particulates are oxidized and removed favorably from the particulate filter. On the other hand, when the result at step 202 is positive, the routine goes to step 203 and the valve body 71a is moved from one of the shut-off positions to a middle position.

Figure 21:
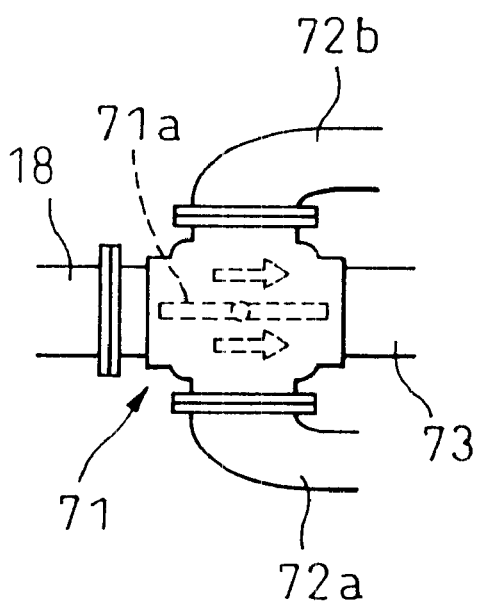
FIG. 21 is a view showing the middle position of the valve body in the changeover portion.

The middle position is between one of the shut-off positions and the other shut-off position as shown in FIG. 21. If the valve body is moved to the middle position, the exhaust gas bypasses the particulate filter as shown by arrows in FIG. 21. Therefore, the heat does not flow-out from the particulate filter, due to no exhaust gas flow, and thus the heat works in the particulate filter so that the temperature of the particulate filter rises higher than the activation temperature of the oxidization catalyst. The exhaust gas at this time has a very low temperature since the engine operation is deceleration. To prevent the decrease of the temperature of the particulate filter, it is effective that the exhaust gas bypasses the particulate filter. Further, in deceleration, since a fuel-cut is carried out or the amount of injected fuel is very small, the exhaust gas includes little particulates and thus even if the exhaust gas bypasses the particulate filter, no problem occurs. Next, at step 204, the reducing agent is supplied to the both sides of the particulate filter by the two reducing agent supplying units 74a and 74b. Therefore, the reducing agent burns favorably on the both sides of the particulate filter and the temperature of the whole of the particulate filter rises by the burned heat. Thus, the amount of particulates that can be oxidized and removed increases so that the relatively large amount of particulates deposited on the exhaust gas downstream surface of the partition wall of the particulate filter, when the valve body is changed over, can be oxidized and removed favorably by this improving means.

Next, at step 205, the valve body is changed over to the other shut-off position, that is, the exhaust gas upstream side and the exhaust gas downstream side of the particulate filter are reversed, and thus the particulates that still remain and deposit can be oxidized and removed favorably.

In the second flowchart, the reducing agent is supplied to oxidize and remove the relatively large amount of particulates deposited on the exhaust gas downstream surface when the valve body is changed over. Therefore, the reducing agent may be supplied only to the exhaust gas upstream side of the particulate filter before the valve body is changed over.

In the second flowchart, since the valve body is changed over every engine deceleration, even if the engine operation is frequently carried out in the area (II) of FIG. 24, the large amount of particulates does not deposit on the whole of the particulate filter and the deposited particulates on the particulate filter do not transform into carbonaceous matter. Thus, the deposited particulates can be oxidized and removed certainly as mentioned above and problems in which the large amount of deposited particulates ignite and burn at one time and the large amount of burned heat melts the particulate filter and the like does not occur.

Besides, if the valve body is changed over every engine deceleration, the changeover of the valve body may become too frequent. To prevent this, if the engine operation is deceleration, the valve body may not be changed over until a predetermined time elapses or the vehicle has run a predetermined running distance after the valve body has been changed over. In the first flowchart, the same changeover mechanism is used. Accordingly, it is possible that the exhaust gas including the particulates bypasses the particulate filter during the changing over of the valve body. However, if the valve body is rapidly changed over, no problem occurs.

By the way, when the air-fuel ratio is maintained lean in the surroundings of the particulate filter, the surface of platinum Pt is covered with oxygen, that is, oxygen contamination is caused. When such oxygen contamination is caused, the oxidization action to $NO_X$ of platinum Pt drops and thus the absorbing efficiency of $NO_X$ drops. Therefore, the amount of active-oxygen released from the active-oxygen releasing agent 61 decreases. However, when the reducing agent is included in the exhaust gas and the air-fuel ratio is made rich as mentioned above, oxygen on the surface of Platinum Pt is consumed and thus the oxygen contamination is cancelled. Accordingly, when the air-fuel ratio is changed over from rich to lean again, the oxidization action to $NO_X$ becomes strong and thus the absorbing efficiency rises. Therefore, the amount of active-oxygen released from the active-oxygen releasing agent 61 increases.

Thus, when the air-fuel ratio is maintained lean, if the air-fuel ratio is changed over from lean to rich once in a while, the oxygen contamination of platinum Pt is cancelled every this time and thus the amount of released active-oxygen increases when the air-fuel ratio is lean. Therefore, the oxidization action of the particulates on the particulate filter 70 can be promoted.

As a manner to make the air-fuel ratio rich, for example, the above-mentioned low temperature combustion may be carried out. Of course, when changing over from the normal combustion to the low temperature combustion or before this, the exhaust gas upstream side and the exhaust gas downstream side of the particulate filter may be reversed. As above mentioned, the low temperature combustion is carried out in the low engine load side and thus the low temperature combustion is often carried out immediately after engine deceleration. Therefore, in the second flowchart, immediately after the valve body 71a is changed over, the low temperature combustion is frequently carried out. Further, to make the air-fuel ratio of the exhaust gas rich, the combustion air-fuel ratio may be merely made rich. Further, in addition to the main fuel injection in the compression stroke, the fuel injector may inject fuel into the cylinder in the exhaust stroke or the expansion stroke (post-injection) or may injected fuel into the cylinder in the intake stroke (pre-injection). Of course, an interval between the post-injection or the pre-injection and the main fuel injection may not be provided. Further, fuel may be supplied to the exhaust system.

Further, when the exhaust gas upstream side and the exhaust gas downstream side of the particulate filter are reversed, even if the large amount of particulates has deposited on one of the trapping surfaces of the partition wall of the particulate filter, the deposited particulates are easily smashed into fine pieces by the reversal flow of the exhaust gas. A part of the particulates that cannot be oxidized and removed in the pores in the partition wall is discharged from the particulate filter. However, therefore, it is prevented that the exhaust resistance of the particulate filter increases more to have a bad influence on the operation of the vehicle, and the large amount of deposited particulates ignite and burn at once to melt the particulate filter by the heat thereof. Further, the other trapping surface of the partition wall of the particulate filter can newly trap the particulates.

By the way, when $SO_3$ exists, calcium Ca in the exhaust gas forms calcium sulfate $CaSO_4$ as ash. To prevent blocking of the meshes of the particulate filter caused by calcium sulfate $CaSO_4$, an alkali metal or an alkali earth metal having an ionization tendency stronger than that of calcium Ca, such as potassium K may be used as the active-oxygen releasing agent 61. Therefore, $SO_3$ diffused in the active-oxygen releasing agent 61 is combined with potassium K to form potassium sulfate $K_2SO_4$ and thus calcium Ca is not combined with $SO_3$ but passes through the partition walls of the particulate filter. Accordingly, the meshes of the particulate filter are not blocked by the ash. Thus, it is desired to use, as the active-oxygen releasing agent 61, an alkali metal or an alkali earth metal having an ionization tendency stronger than calcium Ca, such as potassium K, lithium Li, cesium Cs, rubidium Rb, barium Ba or strontium Sr.

Even when only a noble metal such as platinum Pt is carried on the particulate filter, active-oxygen can be released from $NO_2$ or $SO_3$ held on the surface of platinum Pt. However, in this case, a curve that represents the amount of particulates that can be oxidized and removed (G) is slightly shifted toward the right compared with the solid curve shown in FIG. 24. Further, ceria can be used as the active-oxygen releasing agent. The ceria absorbs oxygen when the oxygen concentration is high ($Ce_2O_3 \rightarrow 2CeO_2$) and releases active-oxygen when the oxygen concentration decreases ($2CeO_2 \rightarrow Ce_2O_3$). Therefore, in order to oxidize and remove the particulates, the air-fuel ratio of the exhaust gas must be made rich at regular intervals or at irregular intervals. Instead of the ceria, iron Fe or tin Sn can be used as the active-oxygen releasing agent.

As the active-oxygen releasing agent, further, it is also allowable to use an $NO_X$ absorbent for purifying $NO_X$. In this case, the air-fuel ratio of the exhaust gas must be made rich at least temporarily to release and reduce the absorbed $NO_X$ and SOX. In the first and second flowcharts, the supply of the reducing agent also functions, for the $NO_X$ absorbent, to make the air-fuel ratio rich.

Figure 29:
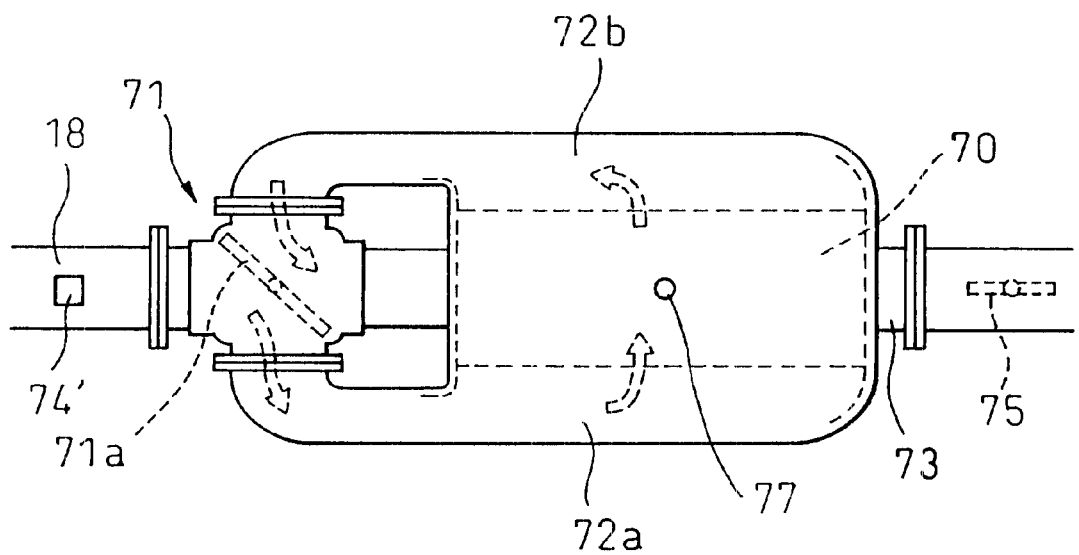
FIG. 29 is a plan view showing near the changeover portion and the particulate filter in the exhaust system according to another embodiment.
Figure 30:
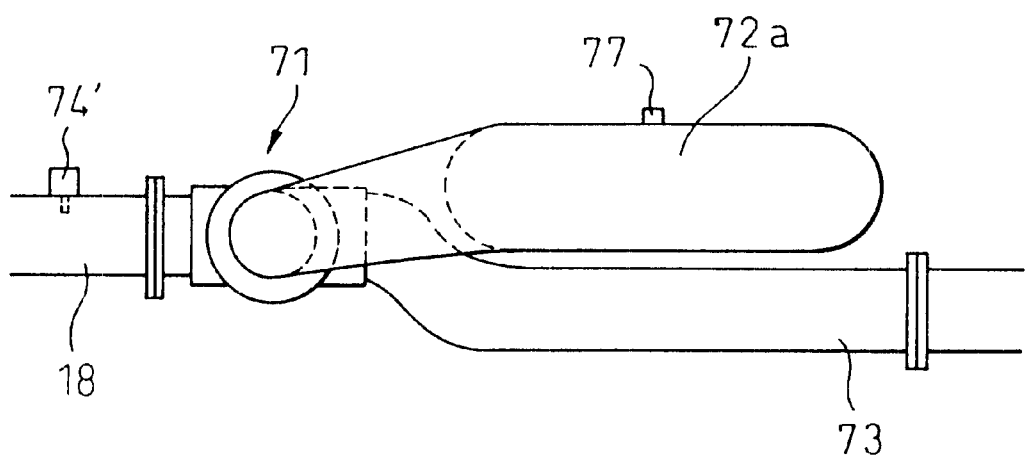
FIG. 30 is a side view of FIG. 29.
Figure 31:
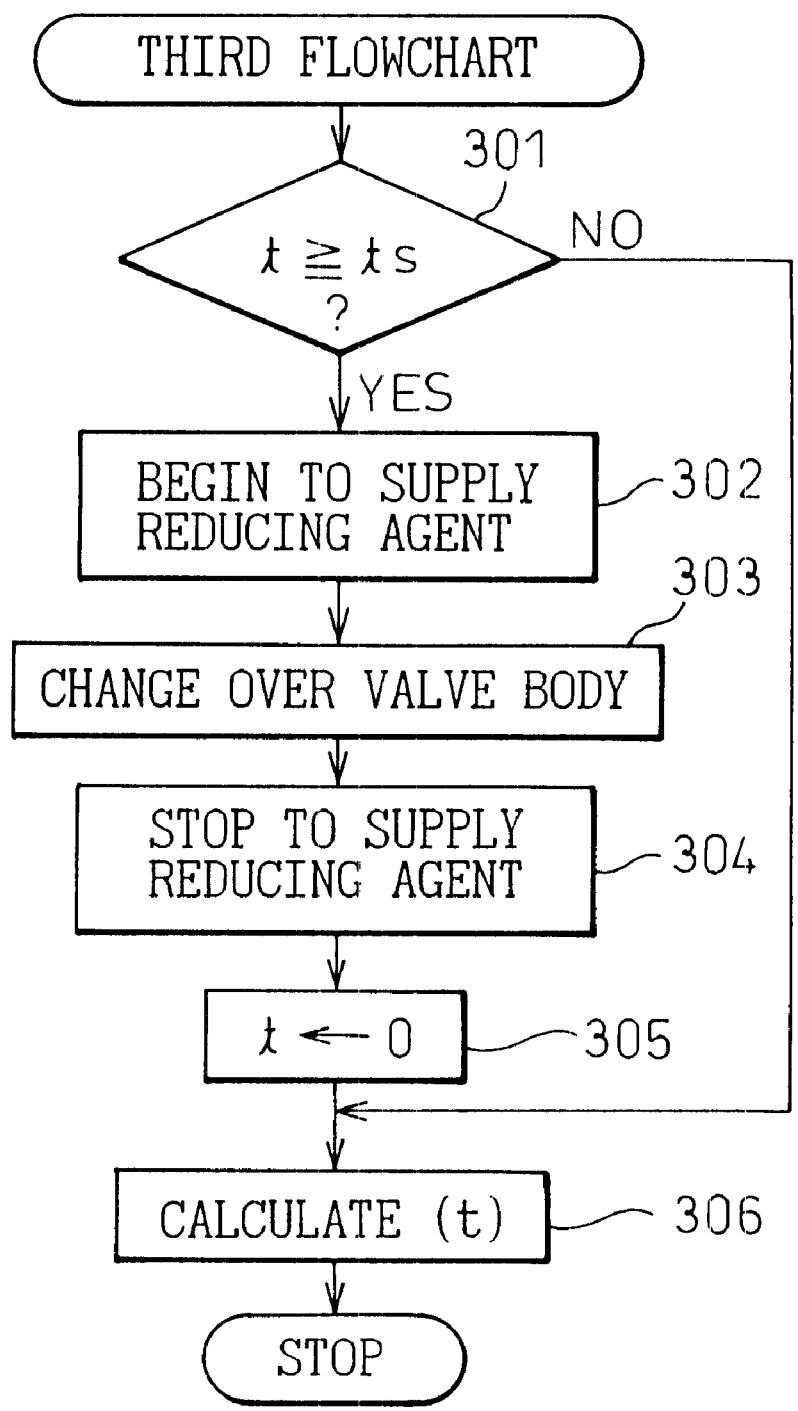
FIG. 31 is a third flowchart for preventing the deposition of the particulates on the particulate filter.

FIG. 29 shows a plan view illustrating a device for purifying the exhaust gas with one reducing agent supplying unit 74' arranged on the upstream side of the changeover portion 71 of the exhaust system. FIG. 30 is a side view thereof. The reducing agent supplying unit 74' and the valve body 71a are controlled according to a third flowchart for preventing the deposition of the particulates shown in FIG. 31. The flowchart is repeated every a predetermined period. First, at step 301, it is determined if an integrated time (t) is larger than a predetermined time (ts). The integrated time (t) is an integrated time after the valve body 71a has been changed over. When the result at step 301 is negative, the routine goes to step 306 and the integrated time (t) is calculated and the routine is stopped. When the result at step 301 is positive, the routine goes to step 302. At step 302, the supplying of the reducing agent by the reducing agent supplying unit 74' is begun. Next, at step 303, the valve body 71a is changed over. That is, the exhaust gas upstream side and the exhaust gas downstream side of the particulate filter are reversed. Next, at step 304, the supplying of the reducing agent is stopped and at step 305, the integrated time (t) is reset to 0. Thereafter, at step 306, a new integrated time (t) is calculated and the routine is stopped.

In the particulate filter 70 of the present embodiment, an oxidization catalyst such as platinum Pt is carried. However, the exhaust gas of the diesel engine includes little reducing material such as HC or CO and thus the increase of the temperature of the particulate filter by the heat of the reducing materials does not occur. Accordingly, mainly, the temperature of the particulate filter depends only on the temperature of the exhaust gas. Thus, the exhaust gas inlet portion (the exhaust gas inlet side portion of each partition wall) of the particulate filter is maintained at the temperature of the exhaust gas. However, the temperature of the exhaust gas outlet portion (the exhaust gas outlet side portion of each partition wall) of the particulate filter becomes much lower than that of the exhaust gas inlet portion by the discharge of heat with the exhaust gas flow.

Even if the reducing agent supplying unit supplies the reducing agent after the exhaust gas upstream side and the exhaust gas downstream side of the particulate filter have been reversed, the current exhaust gas inlet portion of the particulate filter is a low temperature and thus the oxidization catalyst thereon cannot burn the reducing agent favorably. Therefore, the temperature of the whole of the particulate filter cannot rise. However, according to the third flowchart, the valve body is changed over every the predetermined time (ts) and the reducing agent supplying unit supplies the reducing agent before the valve body is changed over. Thus, the temperature of the current exhaust gas upstream inlet portion of the particulate filter is maintained at least at the temperature of the exhaust gas so that the reducing agent is favorably burned by the oxidization catalyst and the relative large amount of burned heat is produced. Therefore, the temperature of the exhaust gas inlet portion of the particulate rises and the temperature of the exhaust gas outlet portion rises higher than that of the exhaust gas inlet portion with arrival of an amount of heat larger than that of discharged heat from the exhaust gas inlet portion.

Next, the upstream side and the downstream side of the particulate filter are reversed by the valve body and thus the reducing agent, supplied until the supplying of the reducing agent is stopped, burns favorably on the current exhaust gas inlet portion of which temperature has risen higher and the larger amount of burned heat is produced. Therefore, the temperature of the exhaust gas inlet portion rises higher and the temperature of the exhaust gas outlet portion rises higher than that of the exhaust gas inlet portion. Thus, even if the relatively small amount of reducing agent is used, the temperature of the whole of the particulate filter can be made to rise very effectively, and thus the amount of particulates that can be oxidized and removed can be made to increase considerably. Therefore, even if the engine operation is frequently carried out in the area (II) of FIG. 24 during the predetermined time (ts) and thus some particulates remain and deposit on the particulate filter, the residual and deposited particulates can be oxidized and removed favorably. Further, the oxidization catalyst on the exhaust gas inlet portion, before the valve body is changed over, is contaminated by soluble organic fraction (SOF) and thus the function thereof drops. However, after the valve body is changed over, this oxidization catalyst positions on the exhaust gas outlet portion and the temperature of this oxidization catalyst is raised considerably, and thus the SOF contamination can be cancelled favorably. Of course, the reversing of the exhaust gas upstream side and the exhaust gas downstream side of the particulate filter also function to oxidize and favorably remove the residual particulates on the particulate filter as in the explanation of the first flowchart.

In the third flowchart, since the valve body is changed over every the predetermined time (ts), even if the engine operation is frequently carried out in the area (II) of FIG. 24, the large amount of particulates does not deposit on the whole of the particulate filter and the deposited particulates on the particulate filter do not transform into carbonaceous matter. Thus, the deposited particulates can be oxidized and removed certainly as mentioned above and problems in which the large amount of deposited particulates ignite and burn at one time and the large amount of heat is produced to melt the particulate filter and the like does not occur.

Of course, it does not limit to the present invention to change over the valve body every the predetermined time (ts). The valve body may be changed over every predetermined running distance or may be changed over at any time in which the large amount of particulates does not deposit and the deposited particulates do not transform into carbonaceous matter. Further, the diesel engine of the present embodiment changes over the first combustion and the second combustion. In the first combustion, the exhaust gas includes the relatively large amount of HC and CO as mentioned above, i.e., the relatively large amount of reducing agent. Therefore, even if no reducing agent supplying unit is provided in the exhaust system, the first combustion can be used as the reducing agent supplying means and thus the valve body may be changed over while the first combustion is carried out.

Thus, if before and after the valve body is changed over, the reducing agent is supplied to the particulate filter, the burning of the reducing agent causes the temperature of the particulate filter to rise and the oxygen concentration of the surroundings of the active-oxygen releasing agent to drop and, thus, the residual particulates on the particulate filer can be oxidized and removed effectively. While the valve body is changed over, the exhaust gas bypasses the particulate filter with the middle position of the valve body. Therefore, when the valve body is in the middle position, if the reducing agent is supplied, the reducing agent in the exhaust gas is emitted into the atmosphere. Accordingly, when the valve body is in the middle position between the two shut-off positions, it is preferably that the reducing agent supplying unit interrupts the supply of the reducing agent.

Figure 32:
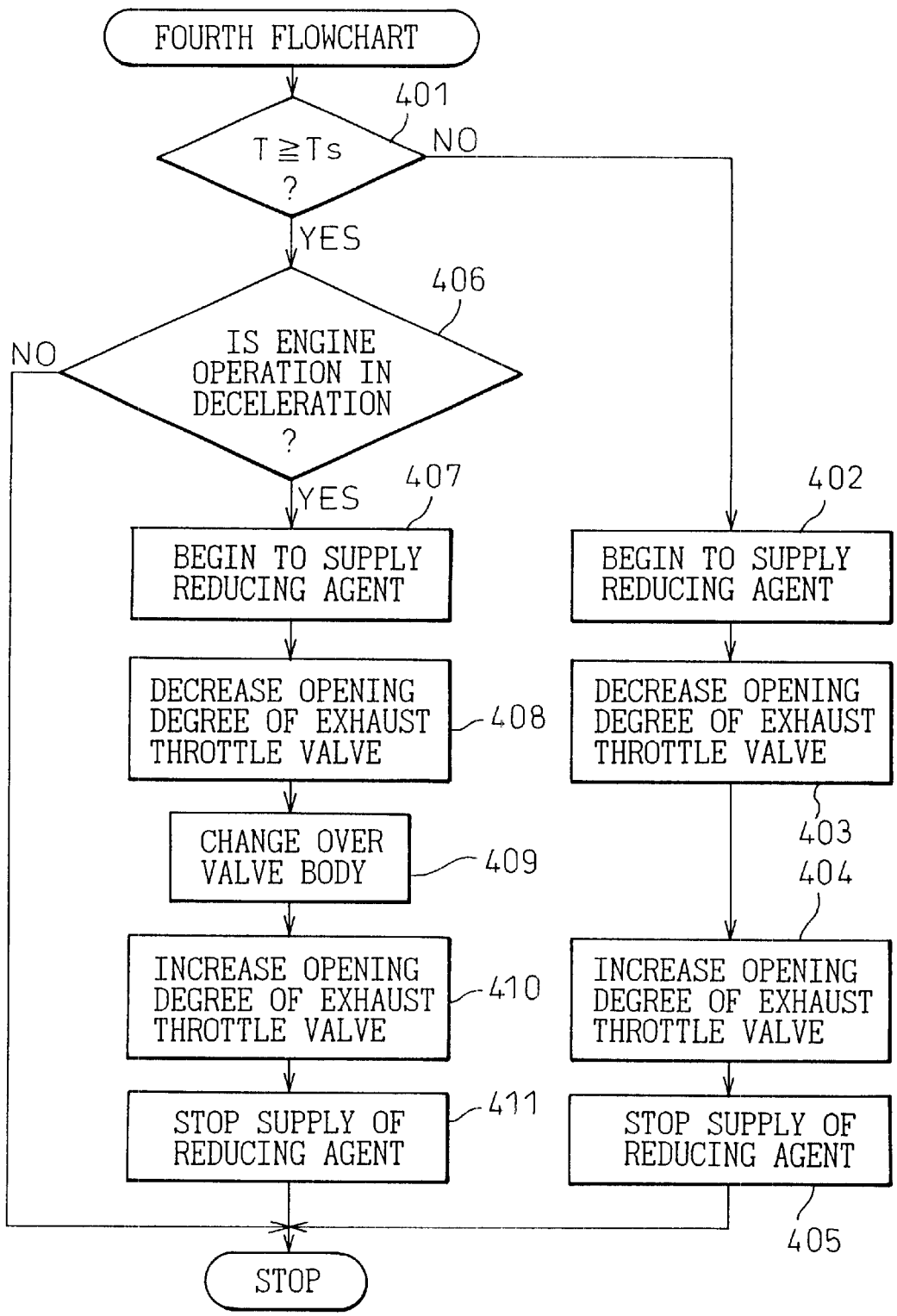
FIG. 32 is a fourth flowchart for preventing the deposition of the particulates on the particulate filter.

Further, if the exhaust gas includes the particulates during the changing over of the valve body, the particulates are emitted into the atmosphere. FIG. 32 is a fourth flowchart to oxidize and remove the particulates without emitting the particulates. The present flowchart controls the exhaust throttle valve 75 in addition to the reducing agent supplying unit 74' and the valve body 71$a$, and is repeated every a predetermined time. First, at step 401, it is determined if the temperature (T) of the particulate filter is higher than a predetermined temperature (Ts). During engine starting, when the result is negative, the amount of particulates that can be oxidized and removed of the active-oxygen releasing agent is low and thus the temperature of the particulate filter must be made high rapidly. Accordingly, the routine goes to step 402 and the supply of the reducing agent is begun. However, at the predetermined temperature (Ts), the oxidization catalyst does not activate sufficiently and cannot burn the reducing agent sufficiently. Accordingly, at step 403, the opening degree of the exhaust throttle valve 75 is made to decrease from the fully opened condition and the heat of the exhaust gas is made to act effectively to the particulate filter. Thus, at least the temperature of the exhaust gas inlet portion of the particulate filter is made to rise to the activation temperature of the oxidization catalyst.

Here, the reducing agent supplying unit 74' preferably injects the reducing agent at a low pressure to allow use of a cheaper unit. Further, the control portion thereof requires a high heat resisting property to arrange near the engine exhaust system. Accordingly, it is preferably arranged apart from the engine exhaust system. Thus, the control portion and the reducing agent supplying unit body in the engine exhaust system are connected by a supply pipe made of stainless steel and the like. In such a construction, the relative long supplying pipe has a relative large volume. Thus, the supply of reducing agent injected at the low pressure via the large volume is automatically stopped when the exhaust pressure in the position of the engine exhaust system on which the reducing agent supplying unit body is arranged rises. Accordingly, even if the supplying of the reducing agent is begun by control of the reducing agent supplying unit, when the exhaust pressure in the above position rises by the decrease of the opening degree of the exhaust throttle valve, the supplying of the reducing agent is actually stopped. Therefore, till the temperature of the exhaust gas inlet portion of the particulate filter rises to the activation temperature of the oxidization catalyst, the reducing agent is not actually supplied to the particulate filter.

Next, at step 404, when the opening degree of the exhaust throttle valve increases to the fully opened condition, the exhaust pressure in the above position drops and the reducing agent is actually supplied to the engine exhaust system. Thus, the burned heat of the reducing agent makes the temperature of the particulate filter rise higher and the amount of particulates that can be oxidized and removed can be made high.

Thereafter, at step 405, the supplying of the reducing agent is stopped. In the determination of step 401, the temperature sensor 77 arranged in the particulate filter can be used. However, the temperature of the particulate filter may be assumed on the basis of the current engine operating condition. Further, during engine starting, it may be determined that the temperature of the particulate filter is lower than the predetermined temperature (Ts) and thus the processes at steps 402–405 may be carried out at every engine start. Further, if the reducing agent supplying unit does not have the above-mentioned construction and can always supply the reducing agent to the particulate filter for example, such that the engine fuel injector injects fuel as the reducing agent in the exhaust stroke, the expansion stroke, or the intake stroke, or such that the reducing agent is supplied at a high pressure to the exhaust system, the reducing agent may be supplied after the opening degree of the exhaust throttle valve is made to increase at step 404.

On the other hand, when the result at step 401 is positive, it is determined if the engine operation is deceleration at step 406. When the result is negative, the routine is stopped. When the result is positive, the routine goes to step 407 and the supply of the reducing agent is begun. Next, the opening degree of the exhaust throttle valve 75 is made to decrease from the fully opened condition. At this time, the decreasing speed is delayed or the process at step 408 is carried out after a predetermined period from the process at step 407. Thus, the reducing agent is actually supplied to the particulate filter. Accordingly, in the particulate filter as the explanation of the third flowchart, the reducing agent burns on the exhaust gas inlet portion and the temperature thereof rises, and the temperature of the exhaust gas outlet portion rises higher than that of the exhaust gas inlet portion. Thereafter, the decrease of the opening degree of the exhaust throttle valve causes the exhaust pressure in the position of the engine exhaust system on which the reducing agent supplying unit body is arranged to rise and thus the supply of the reducing agent is actually stopped.

Next, at step 409, the valve body is changed over, that is, the exhaust upstream side and the exhaust downstream side are reversed. At this time, the engine operation is deceleration and a fuel-cut is carried out or the amount of injected fuel is small, and thus the exhaust gas includes few particulates. Further, the supplying of the reducing agent is stopped and thus the exhaust gas does not include the reducing agent. Accordingly, while the valve body is changed over, even if the exhaust gas bypasses the particulate filter, the particulates and the reducing agent are not emitted into the atmosphere.

Next, at step 410, the opening degree of the exhaust throttle valve is made to increase to the fully opened condition and thus the exhaust pressure in the above position drops and the supply of the reducing agent is begun again. Thereafter, at step 411, the supply of the reducing agent is stopped. Therefore, the temperature of the current exhaust gas inlet portion of the particulate filter is made high and the reducing agent supplied thereto burns favorably. Therefore, the large amount of burned heat raises the temperature of the exhaust gas inlet portion higher and the temperature of the exhaust gas outlet portion is raised considerably. Thus, using the relatively small amount of fuel, the temperature of the whole of the particulate filter can be raised effectively and thus the amount of particulates that can be oxidized and removed can be improved considerably.

According to the fourth flowchart, the valve body is changed over with the supply of the reducing agent every engine deceleration. In the determination of engine deceleration, it may be detected that the brake pedal is depressed or that the accelerator pedal is released. It is unthinkable that the engine is not decelerated for a long time. While the valve body is changed over, even if the engine operation is frequently carried out in the area (II) of FIG. 24, the large amount of particulates does not deposit on the whole of the particulate filter and the deposited particulates on the particulate filter do not transform into carbonaceous matter. Thus, the deposited particulates can be oxidized and removed certainly as mentioned above and problems in which the large amount of deposited particulates ignite and burn at one time and the large amount of burned heat is produced to melt the particulate filter and the like does not occur. The exhaust throttle valve is preferably arranged on the position that is always on the downstream side of the particulate filter to raise the temperature of the particulate filter by the exhaust gas. However, if the exhaust throttle valve is used only to stop the supply of the reducing agent when the valve body is changed over, it may be arranged on the downstream side of the reducing agent supplying unit on the upstream side of the particulate filter.

In the third and fourth flowcharts, the reducing agent is mainly supplied before and after the valve body is changed over. Of course, when the temperature of the exhaust gas inlet portion of the particulate filter is higher than the activation temperature of the oxidization catalyst, the reducing agent may be supplied. Therefore, the temperature of the particulate filter is made higher and the amount of particulates that can be oxidized and removed can be improved and thus the deposition of the particulates can be almost prevented. However, when the temperature of the particulate filter is higher than a certain temperature, if fuel is used as the reducing agent, sulfate is produced on the oxidization catalyst from the sulfur in the fuel. Accordingly, when the temperature of the particulate filter is higher than the certain temperature, it is desirable to stop the supply of the reducing agent.

Figure 33:
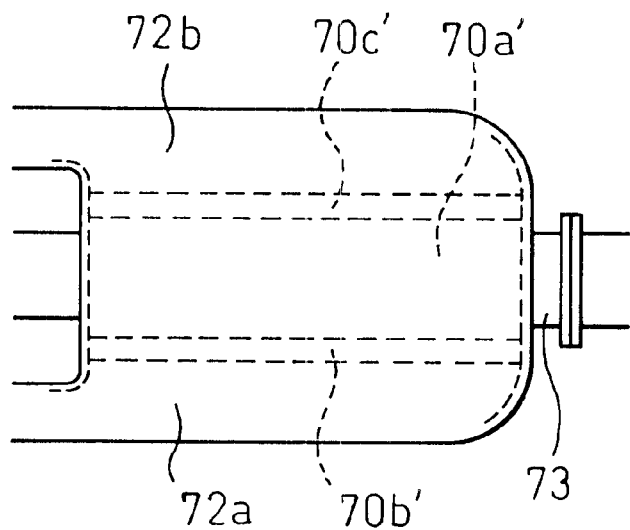
FIG. 33 is a plan view showing near the particulate filter in the exhaust system according to further embodiment

FIG. 33 shows a particulate filter having another construction different from the above particulate filter. The present particulate filter carries the oxidization catalyst and the active-oxygen releasing agent on the central portion 70a', and carries the large amount of oxidization catalyst on the both end portions 70b' and 70c'. Thus, oxidization ability on the both end portions 70b' and 70c' is more than that on the central portion 70a'. Therefore, when the reducing agent is supplied to the particulate filter 70' before and after the valve body is changed over as the first and second flowcharts, even if the amount of reducing agent is very small, the reducing agent burns certainly on the exhaust gas inlet portion of the particulate filter, that is, on the one end portion 70b' or 70c' that has very high oxidization ability. Next, the burned heat further raises the temperature of the other end portion that is the exhaust gas outlet portion of the particulate filter. When the reducing agent is supplied to the other portion by the changing over of the valve body 71a, even if the amount of reducing agent is very small, the reducing agent burns certainly on the other end portion of which temperature is high and that has high oxidization ability. Thus, the burned heat makes the temperature of the other end portion higher and the temperature of the one end portion that is now the exhaust gas outlet portion of the particulate filter is raised higher than that of the other end portion. Therefore, the temperature of the whole of the particulate filter can be certainly raised by using of an amount of the reducing agent smaller than that used in the particulate filter shown in FIG. 29.

Further, even if the reducing agent is not supplied to the particulate filter, the exhaust gas inlet portion of the particulate filter always has high oxidization ability and thus a small amount of reducing material such as HC and CO included in the exhaust gas can burn certainly thereon. Therefore, by only the changing over of the valve body, the temperature of the whole of the particulate filter can be raised favorably.

If the temperature of the whole of the particulate filter rises, the amount of particulates that can be oxidized and removed is improved on the central portion 70a' of the particulate filter and thus the residual particulates and the deposited particulates on the particulate filter can be oxidized and removed favorably. Of course, the both end portions can carry not only the oxidization catalyst but also the active-oxygen releasing agent. Therefore, the residual particulates and the deposited particulates on the both end portions can be favorably oxidized and removed by active-oxygen.

Figure 34:
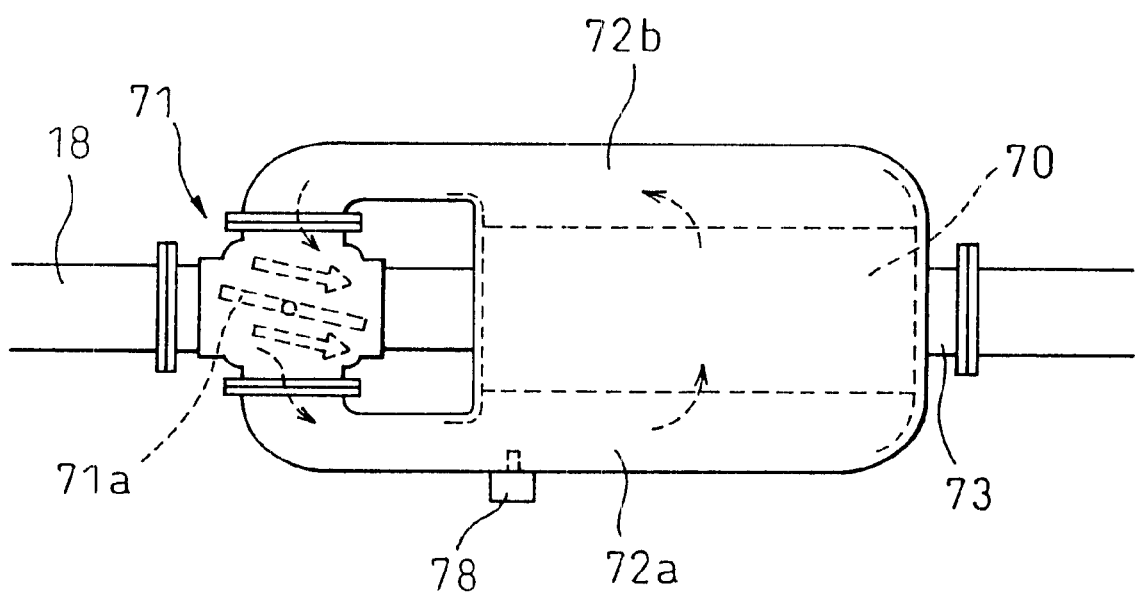
FIG. 34 is a plan view showing near the changeover portion and the particulate filter in the exhaust system according to further embodiment.

FIG. 34 shows a case that a reducing agent supplying unit 78 is arranged in one of the connecting portions, for example, the first connecting portion 72a. As the above mentioned, the above active-oxygen releasing agent also functions as the $NO_X$ absorbent. Thus, the particulate filter carrying the above active-oxygen releasing agent can be used to purifying $NO_X$ in the exhaust gas. In this case, before the $NO_X$ absorbing ability of the particulate filter 70 saturates, the particulate filter must release the absorbed $NO_X$ with the decrease of the oxygen concentration in the surroundings and the released $NO_X$ must be deoxidized by using of a reducing material. For the purpose, the amount of exhausted $NO_X$ from the engine is assumed on the basis of the engine operating condition each time, the integrated amount of absorbed $NO_X$ in the particulate filter is assumed on the basis of the amount of exhausted $NO_X$ of each time, and the air-fuel ratio may be made rich by the reducing agent supplied from the reducing agent 78 before the integrated amount of absorbed $NO_X$ reaches a predetermined amount of absorbed $NO_X$.

The amount of the reducing agent required to deoxidize all of the released $NO_X$ is relative large and if fuel is used as the reducing agent, it includes HC having low reactivity. Therefore, when a large amount of the exhaust gas passes through the particulate filter, if the reducing agent is supplied thereto, at least part of the supplied reducing agent is not consumed in the particulate filter and is emitted into the atmosphere from the particulate filter.

Figure 35:
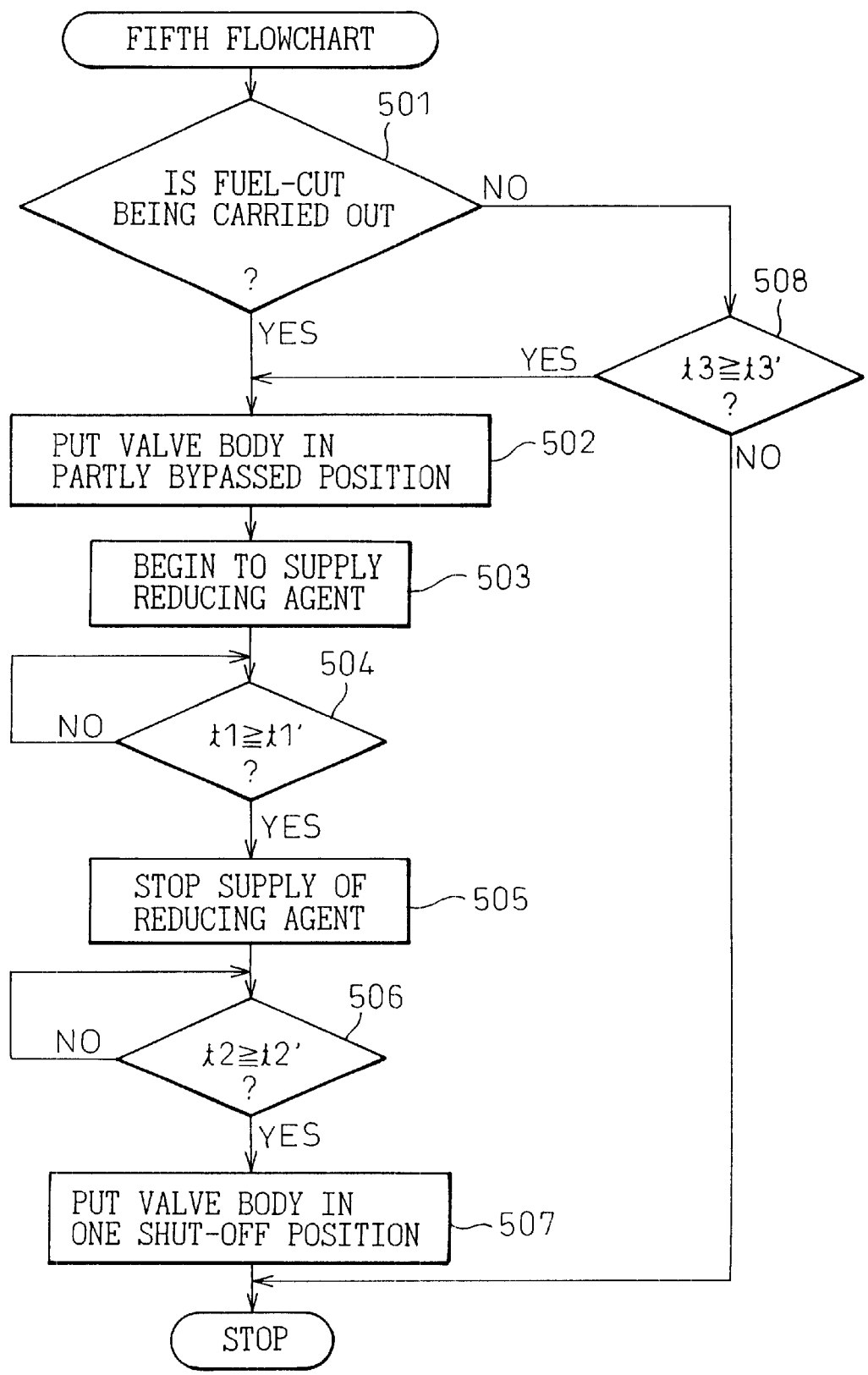
FIG. 35 is a fifth flowchart for causing the particulate filter to release $NO_X$ and to deoxidize the released $NO_X$.

To prevent this, a fifth flowchart for purifying $NO_X$ shown in FIG. 35 is carried out. First, at step 501, it is determined if a fuel-cut is carried out or an amount of injected fuel is very small. In this determination, an output of an acceleration sensor arranged on the vehicle body (not shown), the engine load sensor 41 for detecting the opening degree of the throttle valve, or the crank angle sensor 42 can be utilized. When the result at step 501 is positive, the routine goes to step 502, the valve body 71a is moved to a partly bypassed position. The partly bypassed position is between one of the shut-off positions and the middle position and is a position of the valve body 71a shown in FIG. 34. At this time, the exhaust gas mainly bypasses the particulate filter 70 but only a small amount of the exhaust gas flows into particulate filter 70 from the first connecting portion 72a in which the reducing agent supplying unit 78 is arranged. Next, at step 503, the reducing agent supplying unit 78 begins to supply the reducing agent. Thus, the supplied reducing agent flows into the particulate filter 70 with the small amount of the exhaust gas and causes the air-fuel ratio of the exhaust gas in the particulate filter to be rich. Thus, the active-oxygen releasing agent releases $NO_X$ and the released $NO_X$ is deoxidized by using of the reducing agent. A required amount of the reducing agent is decided in accordance with the current assumed amount of $NO_X$ absorbed in the particulate filter to release all of the absorbed $NO_X$ and to deoxidize it. At step 504, it is determined if the time elapsed from the start of the supply of the reducing agent (t1) reaches a time (t1') set in accordance with the required assumed of the reducing agent. When the result is positive, it is determined that the required amount of $NO_X$ has been already supplied. Accordingly, the routine goes to step 505 and the supply of the reducing agent is stopped.

Next, at step 506, it is determined if the time elapsed from the stopping of the supply of the reducing agent (t2) reaches a time (t2') set in accordance with the amount of supplied reducing agent. When the result is negative, the supplied reducing agent can be consumed sufficiently in the decrease of oxygen concentration in the particulate filter and in the deoxidization of the released $NO_X$ and thus if the large amount of the exhaust gas passes through the particulate filter, a part of the reducing agent is discharged from the particulate filter with the exhaust gas. Accordingly, only when the result at step 506 is positive, the routine goes to step 507 and the valve body 71a is moved to one of the shut-off positions, preferably, to the other shut-off position different from the one shut-off position before the valve body is moved to the partly bypassed position. Thus, all of the supplied reducing agent can be consumed in the decrease of oxygen concentration in the particulate filter and in the deoxidization of the released $NO_X$ without the discharge of the reducing agent.

On the other hand, when the result at step 508, the routine goes to step 508 and it is determined if a time (t3) in which a fuel cut is not carried out reach a predetermined time (t3'). When the result is negative, the routine is stopped. However, when the result is positive, a fuel-cut is not carried out for a long time so that the amount of $NO_X$ absorbed in the particulate filter becomes large and thus the $NO_X$ absorbing ability of the particulate filter 70 may saturate. Accordingly, when the result at step 508 is positive, even if a fuel cut is not carried out, the processes at steps 502–507 are compulsorily carried out to release $NO_X$ from the particulate filter.

When a fuel-cut is carried out or an amount of injected fuel is very small, the temperature of the exhaust gas is low. Accordingly, it is preferable that the exhaust gas at this time mainly bypasses the particulate filter to maintain the temperature of the particulate filter high and to maintain the amount of particulates that can be oxidized and removed high. Further, as mentioned above, when the air-fuel ratio of the exhaust gas is made rich, the above active-oxygen releasing agent does not release only $NO_X$ but also a large amount of active-oxygen. Further, when the reducing agent burns on the particulate filter, the burned heat thereof makes the temperature of the particulate filter increase and thus the amount of particulates that can be oxidized and removed increases. Therefore, if the residual and the deposited particulates exist on the particulate filter, they can be oxidized and removed simultaneously with the deoxidization and purifying of $NO_X$. Further, if the exhaust gas upstream and downstream of the particulate filter are finally reversed, this is advantageous to the oxidization of the residual and deposited particulates as mentioned above.

In the fifth flowchart, when a fuel-cut is carried out or an amount of injected fuel is very small, if the assumed amount of $NO_X$ absorbed in the particulate filter is very small, the absorbed $NO_X$ may not be released from the particulate filter. On the other hand, when the vehicle runs successively at a high speed, the assumed amount of $NO_X$ absorbed in the particulate filter can become larger than the predetermined amount of absorbed $NO_X$ and thus the $NO_X$ absorbing ability of the particulate filter 70 saturates.

Figure 36:
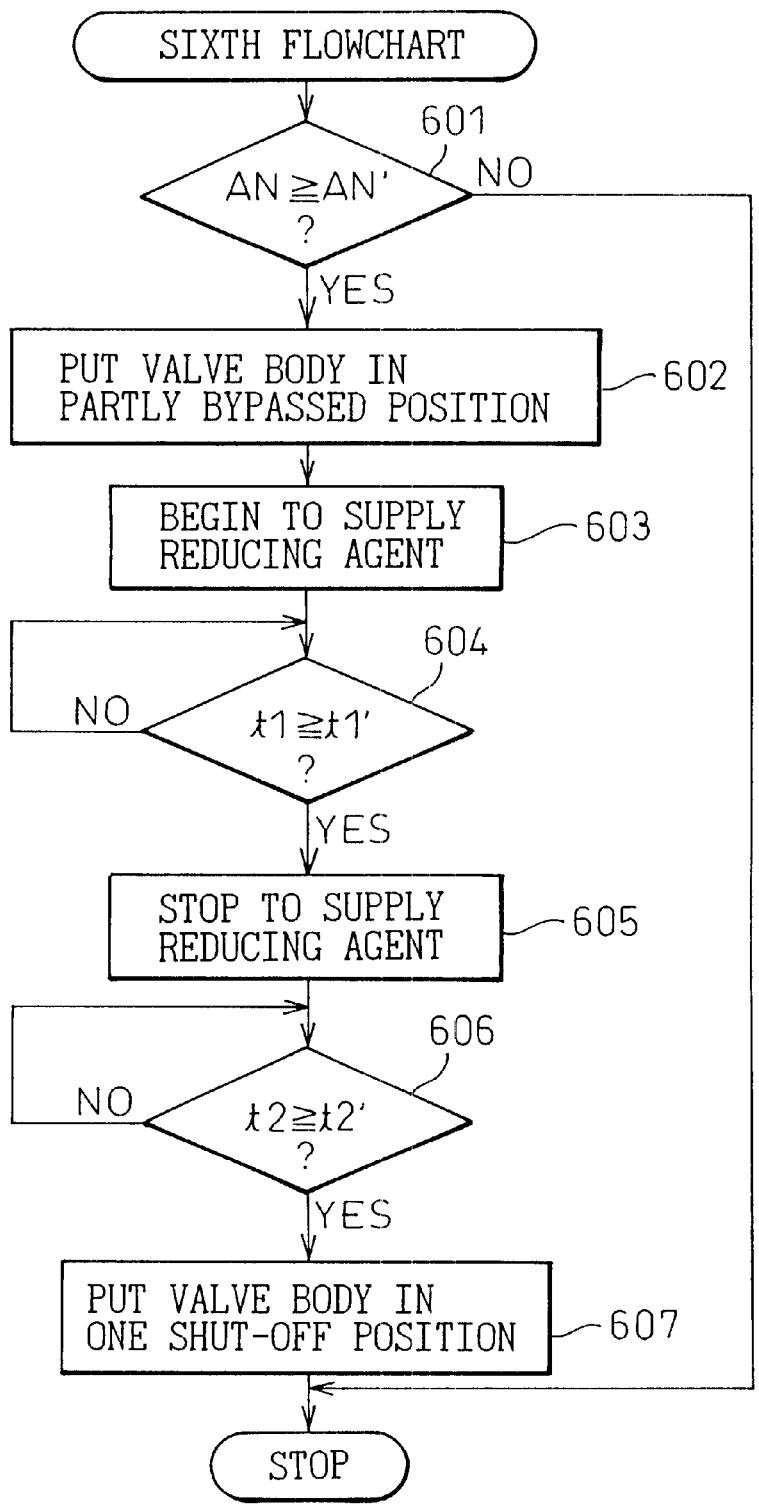
FIG. 36 is a sixth flowchart for causing the particulate filter to release $NO_X$ and to deoxidize the released $NO_X$.

To prevent this, a sixth flowchart shown in FIG. 36 is carried out. The sixth flowchart is repeated every a predetermined time. First, at step 601, it is determined if the assumed amount of $NO_X$ absorbed in the particulate filter (AN) is larger than the predetermined amount of absorbed $NO_X$ (AN'). When the result is negative, the routine is stopped. On the other hand, when the result is positive, processes of steps 602–607 are carried out. The processes of steps 602–607 are similar to steps 502–507 in the fifth flowchart. Thus, the particulate filter releases $NO_X$ and the released $NO_X$ can be deoxidized, and thus the $NO_X$ absorbing ability of the particulate filter 70 does not saturate.

Figure 37:
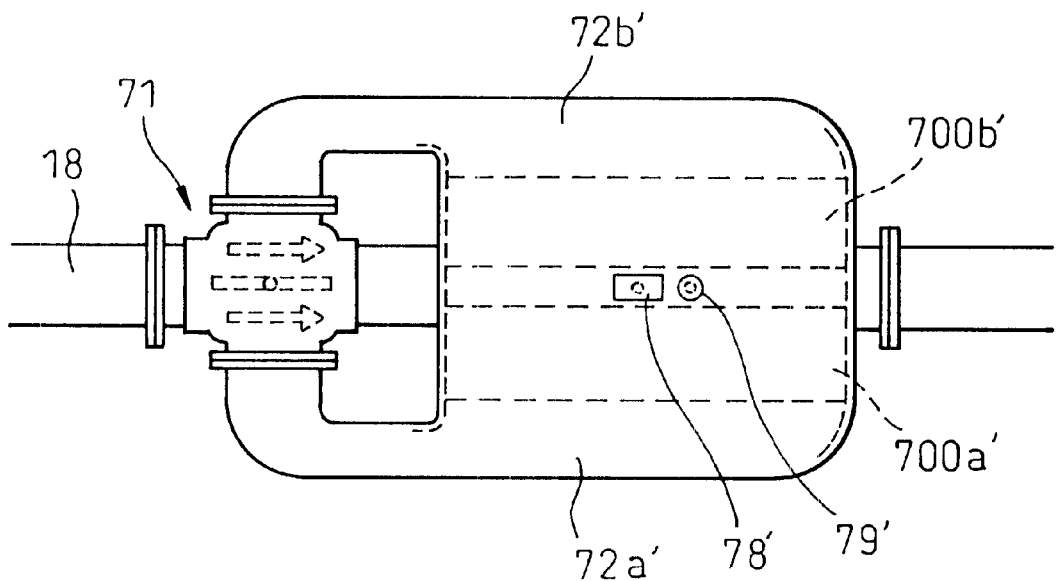
FIG. 37 is a plan view showing near the changeover portion and the particulate filter in the exhaust system according to further embodiment.

FIG. 37 shows another embodiment of a device for purifying the exhaust gas. In the device, the particulate filter 700' is divided into two portions 700a' and 700b' in the direction of the exhaust gas flow direction. The reducing agent supplying unit 78' supplies the reducing agent into the space between the two portions 700a' and 700b' of the particulate filter 700'. In the space, the temperature sensor 79' is also arranged to detect a temperature in the space as the temperature of the particulate filter. In this embodiment, the reducing agent supplied from the reducing agent supplying unit 78' can cause the air-fuel ratio condition in the particulate filter to be rich without the exhaust gas flow. Therefore, in the fifth flowchart or the sixth flowchart, when the reducing agent is supplied, the valve body 71a may be moved to the middle position as shown in FIG. 37. Thus, the valve body 71a is not required to move to the partly bypassed position. This can make controlling the valve body easy.

Figure 38:
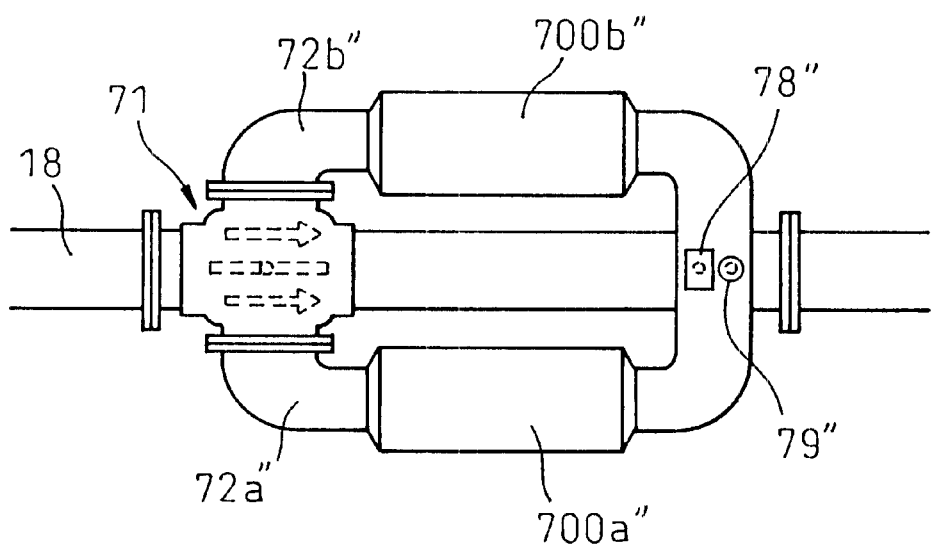
FIG. 38 is a plan view showing near the changeover portion and the particulate filter in the exhaust system according to further embodiment.

FIG. 38 shows a further embodiment of a device for purifying the exhaust gas. In the device, the first connecting portion 72a" and the second connecting portion 72b" are connected each other. In the first connecting portion 72a", a first particulate filter 700a" is arranged and in the second connecting portion 72b", a second particulate filter 700b" is arranged. The reducing agent supplying unit 78" is arranged in the position in which the first connecting portion 72a" and the second connecting portion 72b" are connected each other. In this position, the temperature sensor 79" is also arranged to detect a temperature in this position as the temperatures of the first and second particulate filters. In this embodiment, the reducing agent supplied from the reducing agent supplying unit 78" can cause the air-fuel ratio conditions in the first and second particulate filters to be rich without the exhaust gas flow. Therefore, in the fifth flowchart or the sixth flowchart, when the reducing agent is supplied, the valve body 71a may be move to the middle position as shown in FIG. 38. Thus, the valve body 71a is not required to move to the partly bypassed position. This can make controlling the valve body easy.

Further, the diesel engine of the embodiments can change over the low temperature combustion and the normal combustion. This does not limit the present invention. Of course, the present invention can be also applied to a diesel engine that carries out only the normal combustion or a gasoline engine that emits particulates.

In the present embodiment, the particulate filter itself carries the active-oxygen releasing agent and active-oxygen released from the active-oxygen releasing agent oxidizes and removes the particulate. However, this does not limit the present invention. For example, a particulate oxidization material such as active-oxygen and $NO_2$ that functions the same as active-oxygen may be released from a particulate filter or a material carried thereon, or may flow into a particulate filter from the outside thereof. In case that the particulate oxidization material flows into the particulate filter from the outside thereof, if the first trapping surface and the second trapping surface of the partition wall are alternately used to trap the particulate, on one trapping surface that is now on the exhaust gas downstream side, no particulates deposit newly on the residual particulates and the residual particulates can be gradually oxidized and removed by the particulate oxidization material flowing from the other trapping surface and thus the residual particulates are perfectly removed after some period. During this period, the other trapping surface can trap the particulates and the trapped particulates are oxidized and removed by the particulate oxidization material on the other trapping surface. Thus, effects the same as the above-mentioned can be obtained. Of course, in this case, if the temperature of the particulate filter rises, the temperature of the particulates themselves rises and thus the oxidizing and removing thereof can be made easy.

Although the invention has been described with reference to specific embodiments thereof, it should be apparent that numerous modifications can be made thereto, by those skilled in the art, without departing from the basic concept and scope of the invention.

What is claimed is:

1. A device for purifying the exhaust gas of an internal combustion engine comprising:
   a particulate filter arranged in the exhaust system on which the trapped particulates are oxidized,
   reversing means for reversing the exhaust gas upstream side and the exhaust gas downstream side of said particulate filter, and
   improving means for improving the amount of particulates that can be oxidized and removed on said particulate filter,
   wherein said particulate filter has a trapping wall, said trapping wall has a first trapping surface and a second trapping surface, said reversing means reverses the exhaust gas upstream side and the exhaust gas downstream side of said particulate filter so that said first trapping surface and said second trapping surface are used alternately to trap the particulates, wherein said particulate filter carries an active-oxygen releasing agent on said first and second trapping surfaces, and active-oxygen released from said active-oxygen releasing agent oxidizes the trapped particulates on said particulate filter.

2. A device for purifying the exhaust gas of an internal combustion engine according to claim 1, wherein said active-oxygen releasing agent takes in and holds oxygen when excessive oxygen is present in the surroundings and releases the held oxygen as active-oxygen when the oxygen concentration in the surroundings drops.

3. A device for purifying the exhaust gas of an internal combustion engine according to claim 2, wherein said improving means limits the exhaust gas flow at a position in the exhaust system that is always on the downstream side of said particulate filter.

4. A device for purifying the exhaust gas of an internal combustion engine according to claim 2, wherein said improving means improves the amount of particulates that can be oxidized and removed on said particulate filter before said reversing means reverses the exhaust gas upstream side and the exhaust gas downstream side of said particulate filter.

5. A device for purifying the exhaust gas of an internal combustion engine according to claim 4, wherein said particulate filter has an oxidization ability and said improving means supplies a reducing agent to said particulate filter.

6. A device for purifying the exhaust gas of an internal combustion engine according to claim 1, wherein said improving means improves the amount of particulates that can be oxidized and removed on said particulate filter when it is detected or assumed that the amount of deposited particulates on said particulate filter is larger than a predetermined amount of deposited particulates.

7. A device for purifying the exhaust gas of an internal combustion engine according to claim 6, wherein said predetermined amount of deposited particulates is an amount of deposited particulates where it is assumed that a predetermined amount of particulates is discharged from said particulate filter when said reversing means reverses the exhaust gas upstream side and the exhaust gas downstream side of said particulate filter.

8. A device for purifying the exhaust gas of an internal combustion engine according to claim 1, wherein said particulate filter has an oxidization ability and said improving means supplies a reducing agent to said particulate filter.

9. A device for purifying the exhaust gas of an internal combustion engine according to claim 8, wherein said improving means supplies said reducing agent before and after said reversing means reverses the exhaust gas upstream side and the exhaust gas downstream side of said particulate filter.

10. A device for purifying the exhaust gas of an internal combustion engine according to claim 8, wherein said reversing means comprises a valve body and changes over said valve body from one of two positions to the other of two positions to reverse the exhaust gas upstream side and the exhaust gas downstream side of said particulate filter, and when said valve body is in between said two positions, at least part of the exhaust gas bypasses said particulate filter and said improving means stops the supply of said reducing agent.

11. A device for purifying the exhaust gas of an internal combustion engine according to claim 8, wherein an exhaust throttle valve is arranged in a portion of the exhaust system that is on the downstream side of said particulate filter, and when the temperature of said particulate filter is lower than a predetermined temperature, said exhaust throttle valve limits the exhaust gas flow to cause said temperature of said particulate filter to be higher than said predetermined temperature and thereafter said improving means supplies said reducing agent.

12. A device for purifying the exhaust gas of an internal combustion engine according to claim 8, wherein said reversing means comprises a valve body and changes over said valve body from one of two positions to the other of two positions to reverse the exhaust gas upstream side and the exhaust gas downstream side of said particulate filter, when said valve body is in between said two positions, at least part of the exhaust gas bypasses said particulate filter, said improving means supplies said reducing agent at a low pressure, an exhaust throttle valve is arranged on the downstream side of a position of the exhaust system in which said reducing agent is supplied, and when in engine deceleration, said exhaust throttle valve limits the exhaust gas flow and the exhaust gas upstream side and the exhaust gas downstream side of said particulate filter are reversed by said valve body.

13. A device for purifying the exhaust gas of an internal combustion engine comprising a particulate filter arranged in the exhaust system on which the trapped particulates are oxidized, and reversing means for reversing the exhaust gas upstream side and the exhaust gas downstream side of said particulate filter, wherein said particulate filter carries an active-oxygen releasing agent, active-oxygen released from said active-oxygen releasing agent oxidizes the trapped particulates on said particulate filter, said active-oxygen releasing agent holds $NO_X$ to combine the $NO_X$ with oxygen when excessive oxygen is present in the surroundings and releases to decompose the combined $NO_X$ and oxygen into $NO_X$ and active-oxygen when the oxygen concentration in the surroundings drops, said particulate filter has a trapping wall, said trapping wall has a first trapping surface and a second trapping surface, wherein said first and second trapping surfaces carry the active-oxygen releasing agent, said reversing means reverses the exhaust gas upstream side and the exhaust gas downstream side of said particulate filter so that said first trapping surface and said second trapping surface are used alternately to trap the particulates, and said device further comprises improving means for improving the amount of particulates that can be oxidized and removed of said particulate filter by making said oxygen concentration in said surroundings drop to release $NO_X$ from said active-oxygen releasing agent.

14. A device for purifying the exhaust gas of an internal combustion engine according to claim 13, wherein said reversing means comprises a valve body and changes over said valve body from one of two positions to the other of two positions to reverse the exhaust gas upstream side and the exhaust gas downstream side of said particulate filter, when said valve body is in a middle position between said two positions, all of the exhaust gas bypasses said particulate filter, said improving means supplies a reducing agent such that said oxygen concentration in said surroundings drop without the exhaust gas flowing into said particulate filter, and when a fuel-cut is carried out or an amount of injected fuel is very small, said valve body is moved to said middle position and said improving means supplies said reducing agent to release $NO_X$ from said active-oxygen releasing agent.

15. A device for purifying the exhaust gas of an internal combustion engine according to claim 13, wherein said reversing means comprises a valve body and changes over said valve body from one of two positions to the other of two positions to reverse the exhaust gas upstream side and the exhaust gas downstream side of said particulate filter, when said valve body is in a partly bypassed position between said two positions, the exhaust gas mainly bypasses said particulate filter and only a small amount of the exhaust gas passes through said particulate filter, said improving means supplies a reducing agent with said small amount of the exhaust gas to said particulate filter to release $NO_X$ from said active-oxygen releasing agent.

16. A device for purifying the exhaust gas of an internal combustion engine according to claim 15, wherein said valve body is kept in said partly bypassed position till a set time elapses after said improving means stops the supply of said reducing agent.

17. A device for purifying the exhaust gas of an internal combustion engine according to claim 15 wherein, when a fuel-cut is carried out or an amount of injected fuel is very small, said valve body is moved to said partly bypassed position and said improving means supplies said reducing agent to release $NO_X$ from said active-oxygen releasing agent.

18. A device for purifying the exhaust gas of an internal combustion engine according to claim 17 wherein, When a fuel-cut is not carried out or an amount of injected fuel does not become very small for a predetermined time, said valve body is compulsorily moved to said partly bypassed position and said improving means supplies said reducing agent to release $NO_X$ from said active-oxygen releasing agent.

19. A device for purifying the exhaust gas of an internal combustion engine according to claim 17 wherein, when the assumed amount of $NO_X$ absorbed in said particulate filter is larger than a predetermined amount of absorbed $NO_X$, said valve body is compulsorily moved to said partly bypassed position and said improving means supplies said reducing agent to release $NO_X$ from said active-oxygen releasing agent.

20. A device for purifying the exhaust gas of an internal combustion engine comprising:

a particulate filter arranged in the exhaust system on which the trapped particulates are oxidized, the particulate filter carries an active-oxygen releasing agent, and active-oxygen released from said active-oxygen releasing agent oxidizes the trapped particulates on said particulate filter, and reversing means for reversing the exhaust gas upstream side and the exhaust gas downstream side of said particulate filter, wherein said particulate filter has a trapping wall, said trapping wall has a first trapping surface and a second trapping surface, wherein said first and second trapping surfaces carry the active-oxygen releasing agent, said reversing means reverses the exhaust gas upstream side and the exhaust gas downstream side of said particulate filter so that said first trapping surface and said second trapping surface are used alternately to trap the particulates, said particulate filter has an oxidation ability and the both end portions of said particulate filter have the oxidization ability higher than that of the central portion of said particulate filter.

21. A device for purifying the exhaust gas of an internal combustion engine according to claim 20, wherein said active-oxygen releasing agent takes in and holds oxygen when excessive oxygen is present in the surroundings and releases the held oxygen as active-oxygen when the oxygen concentration in the surroundings drops.

* * * * *